United States Patent [19]

Barakchi et al.

[11] Patent Number: 5,479,350
[45] Date of Patent: Dec. 26, 1995

[54] EXHAUST GAS TEMPERATURE INDICATOR FOR A GAS TURBINE ENGINE

[75] Inventors: Saied Barakchi, Wichita; Jerry C. Black, II, Valley Center, both of Kans.

[73] Assignee: B&D Instruments and Avionics, Inc., Valley Center, Kans.

[21] Appl. No.: 110,245

[22] Filed: Aug. 23, 1993

[51] Int. Cl.[6] ............................ G06F 19/00; G01K 3/00; G08B 21/00
[52] U.S. Cl. .................. 364/431.02; 364/424.04; 364/550; 364/431.01; 364/551.01; 364/508; 364/557; 364/554; 364/424.03; 374/102; 374/108; 374/170; 374/183; 324/115; 340/945; 340/973; 340/588; 73/116; 73/117.4
[58] Field of Search .................. 364/431.01–431.12, 364/424.01, 424.02, 424.03, 550, 551.01, 424.04, 554, 508, 557, 506, 569, 511, 442; 123/479, 489, 564, 416, 483, 484; 374/102, 144, 108–111, 170, 183, 179; 340/438, 945, 973, 959, 588; 324/115; 73/117.4, 116; 60/603, 39.281

[56] References Cited

U.S. PATENT DOCUMENTS

| | | | |
|---|---|---|---|
| 3,237,448 | 3/1966 | Howell et al. | 73/116 |
| 3,250,901 | 5/1966 | Brahm | 73/344 |
| 3,482,440 | 12/1969 | Curwen | 73/116 |
| 3,527,086 | 9/1970 | Evans et al. | 73/116 |
| 3,906,437 | 9/1975 | Brandwein et al. | 364/424.03 |
| 3,946,364 | 3/1976 | Codomo et al. | 364/424.03 |
| 4,135,246 | 1/1979 | McMannis | 364/551 |
| 4,315,296 | 2/1982 | Hancock | 361/103 |
| 4,406,550 | 9/1983 | Gray | 374/110 |
| 4,447,884 | 5/1984 | Wada | 73/557 |
| 4,450,815 | 5/1984 | Mouri | 123/479 |
| 4,502,043 | 2/1985 | Moore | 340/588 |
| 4,575,803 | 3/1986 | Moore | 364/551 |
| 4,594,668 | 6/1986 | Fujawa et al. | 364/431.02 |
| 4,604,701 | 8/1986 | Fujawa et al. | 364/431.01 |
| 4,787,053 | 11/1988 | Moore | 364/551.01 |
| 4,821,216 | 4/1989 | Howell et al. | 364/551.01 |
| 4,849,894 | 7/1989 | Probst | 364/431.01 |
| 4,926,331 | 5/1990 | Windle et al. | 364/424.04 |
| 5,018,069 | 5/1991 | Pettigrew | 364/424.04 |
| 5,033,010 | 7/1991 | Lawrence et al. | 364/550 |

*Primary Examiner*—Kevin J. Teska
*Assistant Examiner*—Jacques H. Louis-Jacques
*Attorney, Agent, or Firm*—Roylance, Abrams, Berdo & Goodman

[57] ABSTRACT

An exhaust gas temperature indicator for a gas turbine engine is disclosed in which data representing discrete overtemperature events occurring at different times is stored in a nonvolatile memory for later retrieval and display on an event-by-event basis. A character display is used to provide detailed digital, alphanumeric or other character information relating to each overtemperature event, such as the number, temperature zone, peak temperature and duration of the event. An indicator is provided for indicating the presence of unacknowledged temperature data in the memory device, and a maximum exhaust gas temperature value for an aircraft flight is stored. An analog display for continuously displaying current exhaust gas temperature values is provided in conjunction with a character display for displaying either current or stored values. Separate caution and warning indicators are utilized for alerting the flight crew to developing overtemperature conditions without the need to rely solely on an analog or digital display.

50 Claims, 21 Drawing Sheets

EXHAUST GAS TEMPERATURE INDICATOR FOR A GAS TURBINE ENGINE

BACKGROUND OF THE INVENTION

The present invention relates generally to temperature indicators, and is particularly concerned with apparatus and methods for indicating or monitoring the exhaust gas temperature in gas turbine engines.

In the operation of gas turbine engines, particularly those used as aircraft powerplants, it is important to continually monitor the exhaust gas temperature of the engine during all phases of operation. A rise in the exhaust gas temperature beyond normal limits may be indicative of an abnormality in the operation of the turbine engine, requiring corrective action by the flight crew or maintenance personnel. Moreover, overtemperature conditions (regardless of cause) are of concern in and of themselves, since their number and duration will affect the lifetime of the engine and the frequency with which it must be inspected and maintained. Generally, the manufacturer of a turbine engine specifies different temperature bands or zones in which the engine is permitted to operate for particular amounts of time, as well as the types of inspection and/or maintenance procedures that are required when these limits are reached.

In the past, it has typically been the responsibility of the flight engineer to monitor the exhaust gas temperature of an aircraft turbine engine, and to note any overtemperature conditions for later use in diagnosing engine problems and calculating maintenance intervals. However, this task is among many others that the flight engineer must perform in a complex multi-engine aircraft, and it is entirely possible for brief overtemperature events to be overlooked by the flight engineer when other distractions are present. To compound the problem, many types of turbine-powered aircraft (particularly smaller aircraft and newer aircraft designed for smaller flight crews) do not provide a separate flight engineer station, and hence the task of monitoring exhaust gas temperatures may shift to the pilot or copilot. In these situations, the capability of automatically monitoring the exhaust gas temperature of a turbine engine becomes highly desirable. Various types of automatic monitoring and recording instruments have been proposed to meet this need.

U.S. Pat. No. 4,575,803, issued to M. Samuel Moore on Mar. 11, 1986, discloses a turbine engine monitoring and recording system in which overtemperature levels are segregated according to temperature band, and the accumulated time during which the engine is within each overtemperature band is measured and recorded in a non-volatile memory. The system includes a remote display panel which may be mounted in the cockpit of an aircraft. A switch on the panel may be operated to cause a digital display unit to indicate the length of time beyond the manufacturer's rated time of operation in the temperature band under consideration. The temperature bands are selected for display using a series of pushbuttons, with each pushbutton corresponding to a separate temperature band or channel. Although this system provides an indication of the accumulated time during which the engine has operated in a given overtemperature band, it does not provide information about individual overtemperature events. This is a significant disadvantage, since a sustained overtemperature condition is generally more harmful to a turbine engine than a series of shorter overtemperature excursions, and it is desirable to be able to distinguish one situation from the other. In addition, knowledge of the number and duration of the individual overtemperature events can be helpful in diagnosing specific types of engine problems for which maintenance may be required.

In U.S. Pat. No. 3,946,364, issued to Joseph Codomo et al on Mar. 23, 1976, overtemperature conditions in jet engines are indicated by means of a light-emitting diode matrix which graphically displays each overtemperature incident in the form of a histogram. In one embodiment, a plurality of overtemperature events are stored for later retrieval, and the indicator device is interrogated to cause it to sequentially display each stored overtemperature event. While this system can provide some useful information about individual overtemperature events, the graphical format of the display is inherently limited in the amount and type of information which can be displayed. Thus, for example, critical information regarding the duration and peak temperature of each overtemperature event can be displayed only approximately and within the limits of the scale of the display. This limits the usefulness of the device for monitoring and diagnostic purposes.

U.S. Pat. No. 4,821,216, issued to John S. Howell et al on Apr. 11, 1989, discloses a multi-function aircraft meter for displaying peak engine temperature, length of time over a predetermined temperature, excessive temperature, and peaks over a temperature limit for both engine starting and operation modes. A combined analog and digital display is provided, and a separate warning indicator is also provided to alert the pilot that a predetermined temperature condition has been exceeded. Temperature exceedences in different bands are detected, and an electromagnetic ball relay is actuated to indicate that an exceedence has occurred. Although the instrument is useful for real-time monitoring of turbine exhaust gas temperature, the lack of any recording capability (other than by actuation of the ball relay) means that it is of only limited utility when a detailed history of individual overtemperature excursions is desired for maintenance or diagnostic purposes.

SUMMARY OF THE INVENTION

The present invention is directed to an exhaust gas temperature indicator in which data representing discrete overtemperature events occurring at different times is stored in a memory device for later retrieval and display on an event-by-event basis. A character display is used to provide detailed digital, alphanumeric or other character information relating to each overtemperature event, such as the number, temperature zone, peak temperature and duration of the event. Other aspects of the invention include the provision of an indicator for indicating the presence of unacknowledged overtemperature data in the memory device, the capability of storing a maximum exhaust gas temperature value for an aircraft flight and resetting this value at the start of the next flight, the use of an analog display for continuously displaying current exhaust gas temperature values in conjunction with a character display for displaying either current or stored values, and the use of separate caution and warning indicators for alerting the flight crew to developing overtemperature conditions without the need to rely exclusively on an analog or digital display.

In one aspect, therefore, the present invention relates to an exhaust gas temperature indicator for a gas turbine engine comprising a temperature input for receiving a temperature signal from a sensor associated with the turbine engine, and a control device coupled to the temperature input for comparing a sensed exhaust gas temperature represented by the temperature signal with a predetermined temperature limit. The control device is also operative to generate data representing a discrete overtemperature event for each instance in which the sensed temperature exceeds the predetermined temperature limit. A storage device is coupled to the control device for storing overtemperature event data relating to a plurality of discrete overtemperature events occurring at different times. A character display is also coupled to the control device for displaying character information corresponding to each of the discrete overtemperature events, with the character information being derived from the overtemperature event data stored in the storage device. The displayed character information may include a numerical display of the peak temperature attained during each discrete overtemperature event, a numerical display of the duration of the overtemperature event, or a display of the order of occurrence of the overtemperature event relative to other overtemperature events. The indicator may also be configured to compare the sensed exhaust gas temperature with a plurality of predetermined temperature limits corresponding to different temperature zones, and in that event the displayed information may also include the temperature zone of each overtemperature event. In this way, a detailed history of discrete overtemperature events can be recorded and displayed on an event-by-event basis to facilitate monitoring of turbine engine performance by an aircraft flight crew, and to make it possible to determine with greater accuracy when inspection and/or maintenance of the turbine engine is required.

In accordance with another aspect of the present invention, an exhaust gas temperature indicator for a gas turbine engine comprises a temperature input for receiving a temperature signal from a sensor associated with a gas turbine engine, and a control device coupled to the temperature input for comparing a sensed exhaust gas temperature represented by the temperature signal with a predetermined temperature limit. The control device is operative to generate overtemperature data when the sensed temperature exceeds the predetermined temperature limit. A storage device is coupled to the control device for storing the overtemperature data, and a display device is coupled to the control device for displaying the overtemperature data stored in the storage device. A first switch is coupled to the control device and, when actuated, causes the display device to display the stored overtemperature data and the control device to record an acknowledgement that the data has been displayed. An indicator is also coupled to the control device for indicating the presence of unacknowledged overtemperature data in the storage device, and the control device is operative to disable the indicator when no unacknowledged overtemperature event data remains in the storage device. Thus, the flight crew is continually alerted to the fact that unacknowledged temperature event data remains in the storage device, and is unlikely to overlook the need to review and record this information.

In accordance with a further aspect of the present invention, an exhaust gas temperature monitor for a gas turbine engine comprises a temperature input for receiving a temperature signal from a sensor associated with a gas turbine engine, a control device coupled to the temperature input, and a storage device coupled to the control device. The control device is operative to compare a sensed exhaust gas temperature represented by the temperature signal with a predetermined minimum operating temperature, to monitor the peak temperature value represented by the temperature signal after the sensed exhaust gas temperature exceeds the predetermined minimum operating temperature, and to cause the storage device to store the peak temperature value. In this way, the maximum exhaust gas temperature attained during an entire flight of an aircraft will be recorded for later retrieval, and this value will be automatically updated at the start of the next flight without intervention by the flight crew.

In accordance with a still further aspect of the present invention, an exhaust gas temperature indicator for a gas turbine engine comprises a temperature input for receiving a temperature signal from a sensor associated with a gas turbine engine, and a control device coupled to the temperature input for monitoring a sensed exhaust gas temperature represented by the temperature signal. The control device is operative to generate data to be stored when the sensed temperature meets a predetermined condition, and a storage device is coupled to the control device for storing such data. A switch is coupled to the control device, and a character display is also coupled to the control device for displaying character information. The control device is operative to cause the character display to normally display a numerical indication of the current exhaust gas temperature represented by the temperature signal, and is operative in response to actuation of the switch to cause the character display to display character information derived from the data stored in the storage device. An analog display is coupled to the control device for providing a continuous analog display of the current exhaust gas temperature represented by the temperature signal. Thus, by virtue of the analog display, the aircraft flight crew is provided with current exhaust gas temperature information even during intervals when the character display is being used to display stored data.

In accordance with a still further aspect of the present invention, an exhaust gas temperature indicator for a gas turbine engine comprises a temperature input for receiving a temperature signal from a sensor associated with a gas turbine engine, and a control device coupled to the temperature input for monitoring a sensed exhaust gas temperature represented by the temperature signal. The control device is operative to compare the sensed temperature with a predetermined caution level temperature and with a predetermined warning level temperature, respectively, with the warning level temperature being higher than the caution level temperature. A display device is coupled to the control device for providing a quantitative indication of the current exhaust gas temperature represented by the temperature signal. In addition, an overtemperature caution indicator is coupled to the control device for indicating a current exhaust gas temperature in excess of the predetermined caution level temperature, and an overtemperature warning indicator is coupled to the control device for indicating a current exhaust gas temperature in excess of the predetermined warning level temperature. In this way, the flight crew is alerted to a developing overtemperature condition at a relatively early stage and without the need to rely on the display device alone.

The present invention is also directed to methods for indicating or monitoring the exhaust gas temperature of a gas turbine engine. These methods may be carried out using the exemplary apparatus disclosed and claimed herein.

BRIEF DESCRIPTION OF THE DRAWINGS

The various objects, advantages and novel features of the invention will be more readily apprehended from the following detailed description when read in conjunction with the appended drawings, in which.

Throughout the drawings, like reference numerals are used to identify like parts and components.

DETAILED DESCRIPTION OF THE PREFERRED EMBODIMENT

Figure 1B:
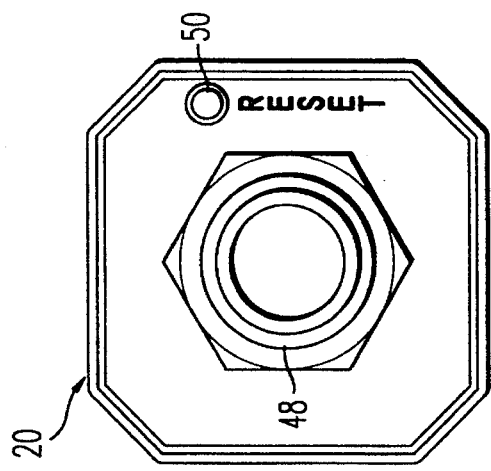
FIGS. 1A–1C are front, rear and side views, respectively, of an exhaust gas temperature indicator constructed in accordance with the principles of the present invention.
Figure 1A:
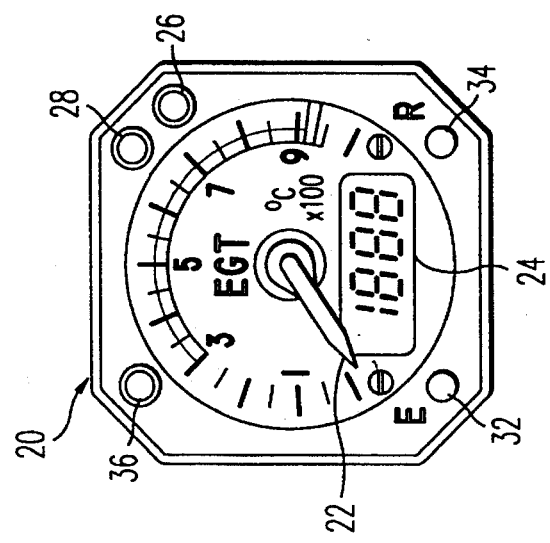
Figure 1C:
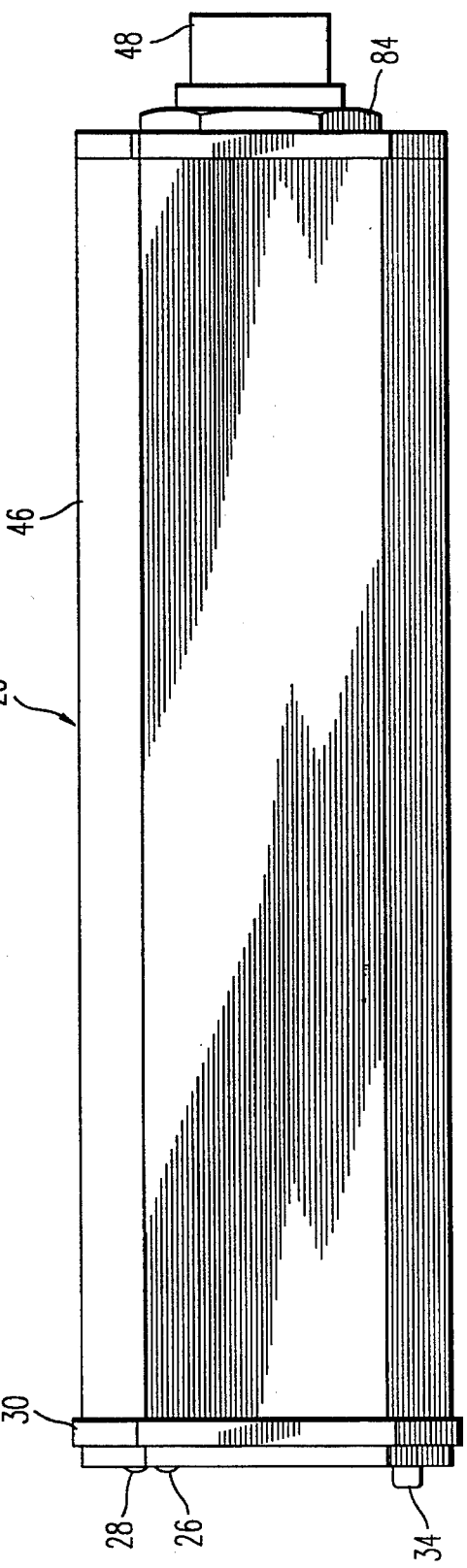

An aircraft cockpit instrument 20 for monitoring, indicating and recording the exhaust gas temperature (EGT) of a gas turbine engine in accordance with the present invention is illustrated in FIGS. 1A–1C. The instrument displays the EGT in analog format using a moving pointer 22 driven by a stepper motor, and simultaneously in character format using a 3½-digit incandescent digital display 24. Temperature inputs are received from thermocouples which are mounted in the gas turbine engine being monitored. Overtemperature conditions are indicated by caution and warning lamps 26 and 28 on the instrument bezel 30, and data relating to overtemperature excursions in various temperature zones is stored in nonvolatile memory for later retrieval. The retrieval function is controlled by EVENT and RECALL pushbuttons 32 and 34 located on the front bezel 30 of the instrument, and the incandescent display 24 normally used for indicating the current EGT value is used for displaying stored data during the retrieval mode. The analog pointer 22 continues to indicate the current EGT value during the memory retrieval operation. An overtemperature event lamp 36 is provided on the front bezel 30 of the instrument in order to indicate that unacknowledged overtemperature event data is stored in memory.

The lamps 26, 28 and 36 are preferably provided with lenses of different colors so that they can be readily distinguished by the flight crew. In the preferred embodiment, the caution lamp 26 is yellow or amber in color, the warning lamp 28 is red in color, and the overtemperature event lamp 36 is blue in color. The analog pointer 22 operates in conjunction with a numerical scale 38 which is calibrated in 50° C. increments between 0° and 1,000° C. The scale 38 includes a green arc 40 between 300° C. and 875° C. to indicate normal operating temperatures, a yellow arc 42 between 875° C. and 915° C. to indicate a caution zone, and a red line 44 at 915° C. to indicate an overtemperature warning. The last 10° of the yellow band 42 corresponds to the temperature zone in which the amber caution lamp 26 will operate, and the red line 44 corresponds to the lowest temperature at which the red warning lamp 28 will operate.

The exhaust gas temperature indicator 20 is housed in a standard 2.0-inch diameter round or octagonal case 46 with a maximum depth of approximately 8 inches to allow installation in most aircraft instrument panels. A connector keyway 48 is provided on the rear of the indicator to accommodate a standard circular electrical connector containing input, output and power connections. A RESET pushbutton 50 is also provided on the rear of the indicator in order to allow overtemperature event data to be cleared from memory by ground maintenance personnel. The indicator 20 must be removed from the aircraft panel to gain access to the RESET pushbutton 50, thereby preventing inadvertent operation of this pushbutton by the flight crew and consequent loss of critical overtemperature event data. The exhaust gas temperature indicator 20 as a whole is preferably configured as a single, self-contained line replaceable unit (LRU) which can be installed in an aircraft instrument panel and removed as a unit when maintenance or replacement is needed.

Figure 2:
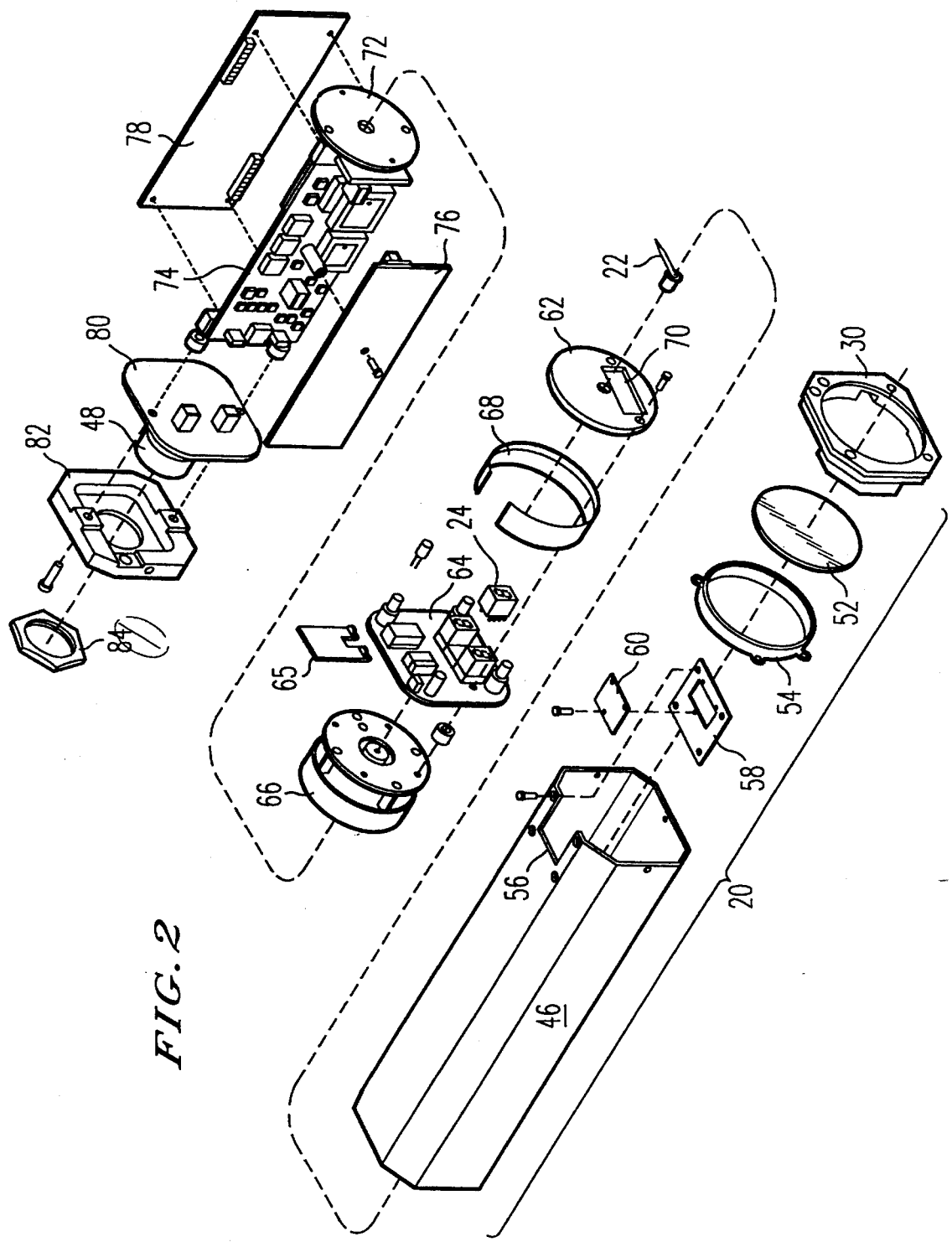
FIG. 2 is an exploded view of the exhaust gas temperature indicator, illustrating various internal components.

FIG. 2 is an exploded view of the exhaust gas temperature indicator 20 of FIG. 1, illustrating the principal internal components of the indicator. The front bezel 30 of the indicator receives a clear glass window 52 which is held in place by a retaining ring 54. The bezel 30 is affixed to the front of the case 46, and the forward top edge of the case 46 is formed with a cut-out 56 which receives a backlighting access door assembly consisting of a door frame 58 and a removable door 60. The shaft of the analog pointer 22 passes through a hole in the gauge face 62 and through a similar hole in a circuit board 64 in order to connect to the shaft of a stepper motor 66. The circuit board 64 carries the lamps 26, 28 and 36, a removable backlighting assembly 65, the pushbuttons 32 and 34, and the digital display 24 shown in FIG. 1A. A light shield 68 is mounted between the circuit board 64 and gauge face 62 directs the light generated by the lamps in the backlighting assembly 65 toward the rear of the gauge face 62. The gauge face 62 is formed with a rectangular window 70 for the digital display 24.

With further reference to FIG. 2, the stepper motor 66 is affixed to a mounting plate 72 that is attached to the end of circuit boards 74 and 78. Circuit boards 74, 76 and 78 carry processing circuitry, input/output circuitry and power circuitry for operating the exhaust gas temperature indicator 20. A connector board 80 is affixed to the rear edge of the main circuit board 74 for carrying the connector keyway 48. The connector keyway 48 passes through a hole in a rear cover 82 and is secured by a hex nut 84. The rear cover 82, case 46, window 52 and front bezel 30 together form a shielded housing for the internal components of the exhaust gas temperature indicator 20.

Figure 3A:
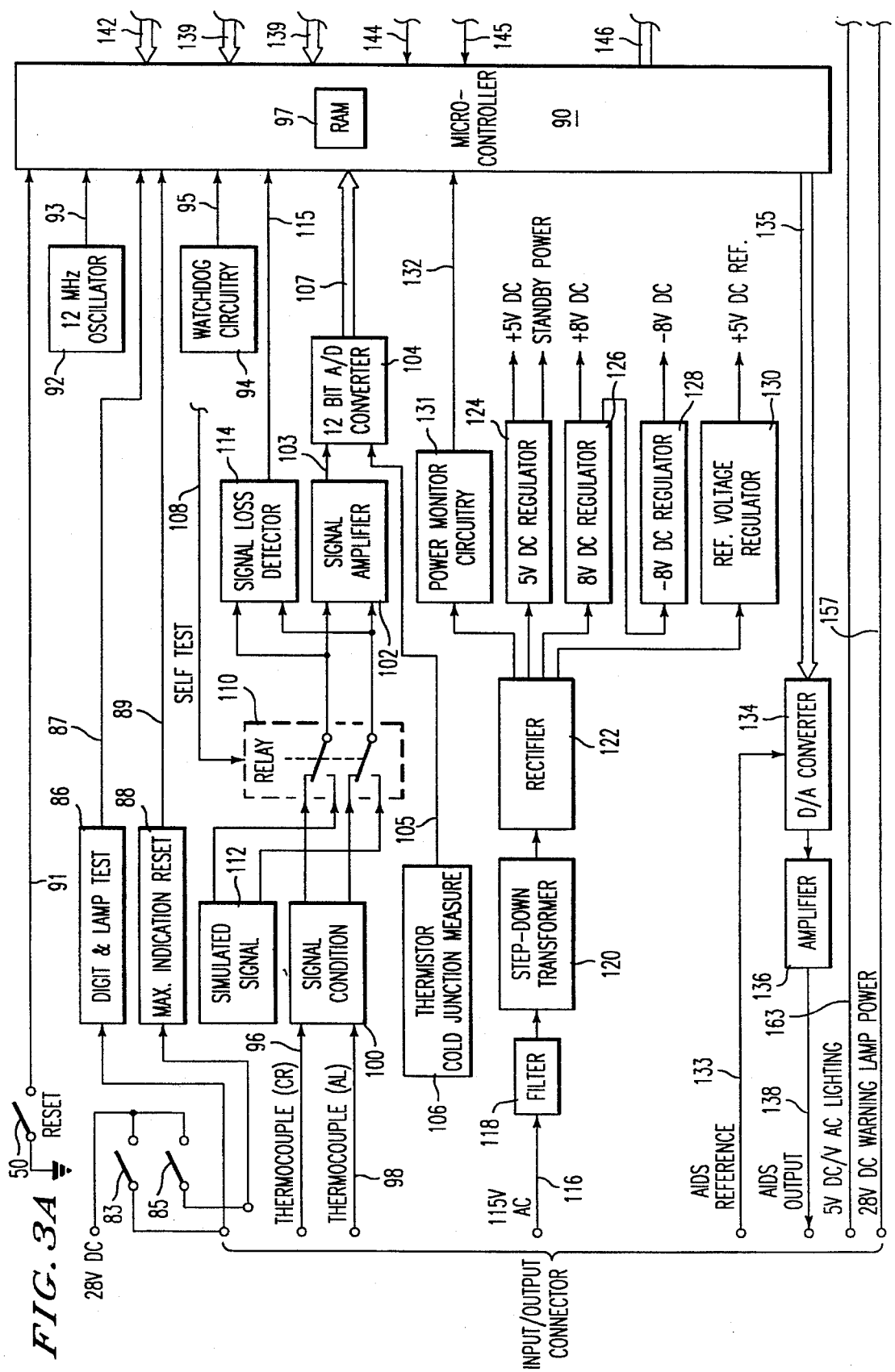
FIGS. 3A and 3B comprise a block diagram of the principal electrical components of the exhaust gas temperature indicator.
Figure 3B:
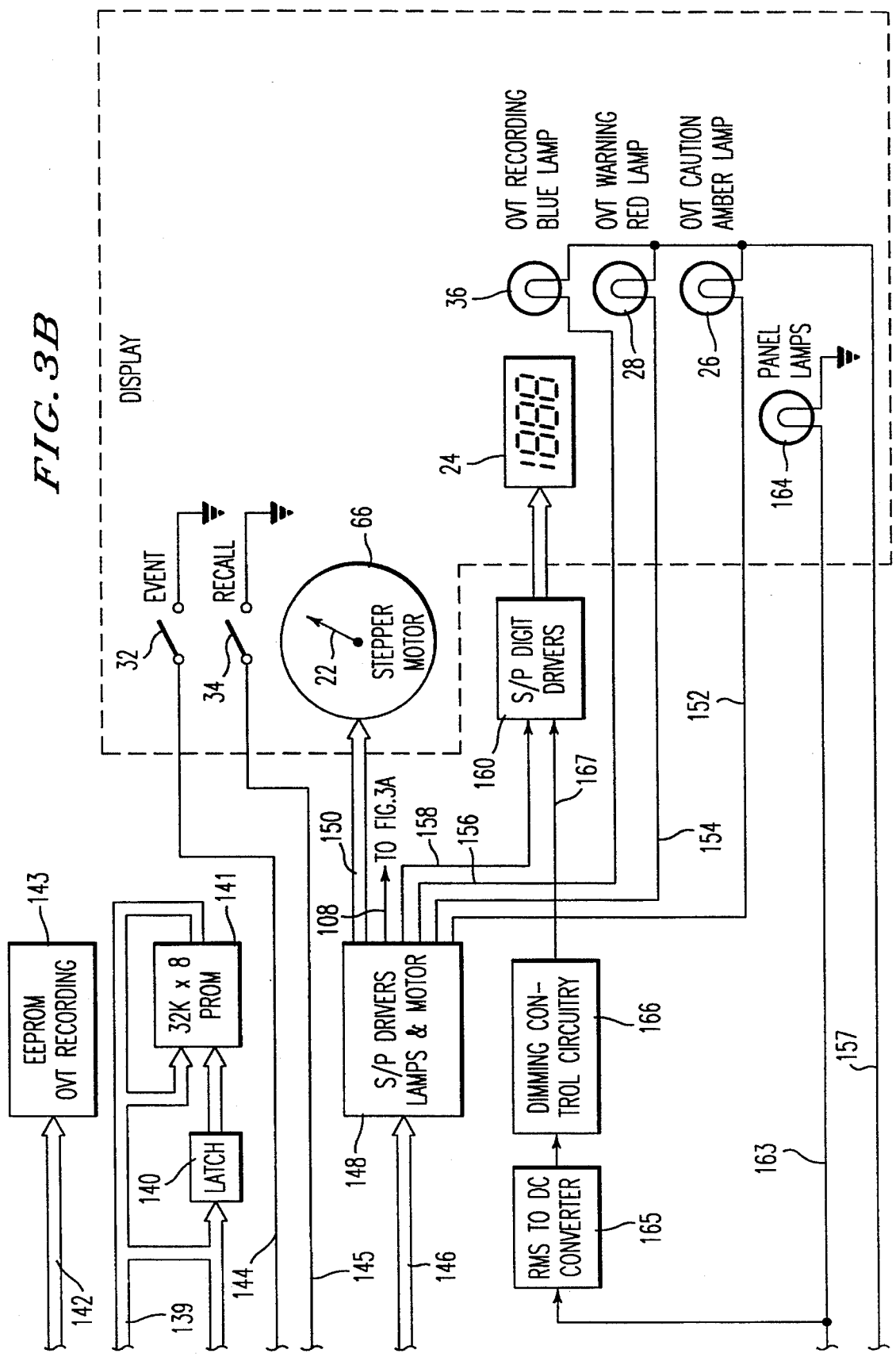

FIGS. 3A and 3B comprise a block diagram illustrating the principal electrical components of the exhaust gas temperature indicator 20. As is conventional, single-width lines represent discrete electrical wires or conductors, while full-width lines represent multiple data, address and/or control lines. Referring to the left-hand side of FIG. 3A, various input and output connections are shown which correspond to those appearing at the connector 48 in FIGS. 1B and 1C. Two 28 volt DC inputs from the aircraft electrical system are applied via remote momentary switches 83 and 85 to the inputs of a digit and lamp test circuit 86 and a maximum indication reset circuit 88, respectively, and the outputs 87 and 89 of these circuits are applied as inputs to a microprocessor-based microcontroller 90 having internal random-access memory (RAM) 97. Upon activating the switch 83, the digit and lamp test circuit 86 causes the microcontroller to illuminate all segments of the digital display 24 and to illuminate the lamps 26, 28 and 36, so that an inoperative segment or lamp can be detected by the flight crew. In response to activation of the switch 85, the maximum indication reset circuit 88 causes the microcontroller 90 to reset to zero the maximum EGT value that was stored during the previous flight, although recording of a new maximum EGT value does not begin immediately after initial power-up but only after the current EGT value exceeds 400° C. The microcontroller 90 also receives an input on line 91 from the RESET switch 50, which is preferably provided in the form of a momentary, normally-open pushbutton switch for applying a low logic level to the microcontroller 90 when actuated. A 12 MHz oscillator 92 is connected to the microcontroller 90 via line 93 to serve as a processor clock. A watchdog circuit 94 provides a reset signal on line 95 to the microcontroller when the supply voltage falls below a predetermined level, and for a predetermined period of time (13 msec in the preferred embodiment) after the supply voltage is restored to its normal value.

In order to allow the exhaust gas temperature indicator 20 to determine the current EGT, conventional chromel-alumel thermocouples (not shown) are mounted on the turbine engine being monitored and are wired in parallel to form an averaging circuit. The chromel and alumel outputs 96 and 98 are applied to a signal conditioning circuit 100 which filters the input signals for electromagnetic interference. The filtered signals are applied to a signal amplifier 102, and the output of this amplifier is applied to one input channel 103 of a 2-channel, 12-bit analog-to-digital (A/D) converter 104. The output 105 of a reference or cold junction thermistor circuit 106 is applied to the second input channel of the A/D converter 104. The thermistor used in the circuit 106 is physically located on the connector board 80 of FIG. 2, and provides a reference signal which is taken as the cold junction temperature for the thermocouple input signal at the input terminals 96 and 98. The A/D converter 104 converts the analog output signal from the amplifier 102 or thermistor circuit 106 to a 12-bit serial digital output which is applied as an input to the microcontroller 90 on lines 107.

In order to test the calibration of the circuit components during initial power-up of the exhaust gas temperature indicator 20, the microcontroller 90 causes a self-test signal to appear on an output line 108 which is connected to the coil of a double-pole, double-throw relay 110. When the self-test signal occurs, the relay contacts move to the positions shown in FIG. 3A and cause the signal amplifier 102 to receive inputs from a simulated signal circuit 112 rather than from the signal conditioning circuit 100. The simulated signal circuit 112 generates a precise DC voltage level that is amplified by the signal amplifier 102 and digitized by the A/D converter 104 for comparison with a standard value stored in memory. A signal loss detector circuit 114 has its input connected in parallel with the inputs of the signal amplifier 102 in order to detect the loss of one or both of the thermocouple input signals on lines 96 and 98. If the thermocouple input signals are interrupted, the signal loss detector circuit 114 produces an output to the microcontroller on line 115. The microcontroller responds by causing the analog pointer 22 to move to a position below 0° C. and the digital display 24 to read "–", thereby indicating a fault in the input signal wiring requiring attention by maintenance personnel.

With further reference to FIGS. 3A, a connector input line 116 is connected to a 115 volt AC, 400 Hz aircraft power supply and is coupled to an inductive and capacitive power line filter 118. The output of the filter 118 is connected to the input of a step-down transformer 120 with a primary to secondary ratio of 7:1, and the transformer output is applied to the input of a full-wave bridge rectifier 122. The output of the rectifier 122 is connected to a +5 volt DC regulator 124 which generates a +5 volt DC output for various circuit components requiring this supply voltage level. The regulator 124 contains storage capacitors for providing a separate +5 volt standby power output that is used to bring the analog pointer 22 of the exhaust gas temperature indicator 20 to the lowest position after power to the indicator is removed. The output of the rectifier 122 is also connected to the input of a +8 volt DC regulator 126, and the output of the regulator 126 is in turn connected to the input of a –8 volt DC regulator 128. The regulators 126 and 128 provide +8 volt and –8 volt DC outputs, respectively, which are required by other subassemblies. A further output from the rectifier 122 is connected to the input of a reference voltage regulator 130, which produces a precise 5.0 volt DC level that is needed for the operation of the 12-bit A/D converter 104. A power monitor circuit 131 is connected to the output of the rectifier 122 in parallel with the voltage regulators 124, 126 and 130. The power monitor circuit functions as a comparator for comparing the rectifier output voltage with a threshold level, and sends a signal to the microcontroller 90 on line 132 to initiate a shut-down procedure when the voltage falls below the required level.

With continued reference to FIGS. 1B and 3A, the exhaust gas temperature indicator 20 is adapted to be connected to an Aircraft Integrated Data Systems (AIDS) unit in order to provide a continuous record of exhaust gas temperature readings that occur during flight. To this end, a connector terminal 133 of the exhaust gas temperature indicator 20 receives a 5 volt DC precision reference voltage from the AIDS unit (not shown) and applies this reference voltage to a digital-to-analog (D/A) converter 134. The D/A converter 134 utilizes the reference voltage and a digital output from the microcontroller 90 on lines 135 to supply an analog output signal to an amplifier 136. The amplifier 136 supplies a varying analog voltage representing an exhaust gas temperature range of –55° C. to +999° C. to an AIDS output terminal 138 which is coupled to the aircraft AIDS recorder.

Referring now to FIG. 3B, the microcontroller 90 is connected by means of lines 139 and latch 140 to a 32-kilobyte programmable read-only memory (PROM) 141 which stores software programs and tables used in the operation of the exhaust gas temperature indicator 20. The microcontroller 90 is also connected via lines 142 to an electrically erasable programmable ready-only memory (EEPROM) 143 which is used to store overtemperature event data, maximum flight EGT values, and other data used in the operation of the exhaust gas temperature indicator 20. The microcontroller 90 receives inputs on lines 144 and 145 from the EVENT and RECALL switches 32 and 34, which are physically positioned on the bezel or display area of the indicator 20 as shown in FIG. 1A. As in the case of the RESET switch 50 of FIGS. 1B and 3A, the EVENT and RECALL switches 32 and 34 are momentary, normally-open pushbutton switches which apply a low logic level to the microcontroller 90 when actuated. In order to control the analog pointer 22, digital display 24 and lamps 26, 28 and 36, the microcontroller 90 produces control outputs on lines 146 to a serial-to-parallel driver circuit 148. Output lines 150 from the driver circuit 148 are applied as inputs to the stepper motor 66 to control the position of the analog pointer 22, and an output is also produced on line 108 to control the relay 110 of FIG. 3A. Additional outputs 152, 154 and 156 control the application of ground potential to the lamps 26, 28 and 36, respectively. The opposite terminals of the lamps 26, 28 and 36 are connected in common to a 28-volt DC input line 157, which in turn is coupled to the aircraft power supply through the input/output connector. A further output line 158 from the driver circuit 148 is connected to the input of a serial-to-parallel digit driver circuit 160. The parallel outputs 162 of the digit driver circuit 160 are connected to the individual characters or digits of the segmented digital display 24 of FIG. 1.

FIGS. 3A and 3B also illustrate a terminal 163 on the input/output connecter which is connected to a 5-volt AC or DC lighting power supply in the aircraft. The 5-volt source is used to supply power to panel lamps 164 which provide backlighting for the gauge face 62 of the exhaust gas temperature indicator 20. The 5-volt line is also connected to the input of an RMS-to-DC converter 165, and the output of the converter 165 is connected to the input of a dimming control circuit 166. The output 167 of the dimming control circuit 166 is applied to the input of the serial-to-parallel digit drivers 160, in order to apply reduced power to the segments of the digital display 24 whenever the lighting voltage on line 164 is above 0.6±0.4 volts AC or DC.

Figure 4A:
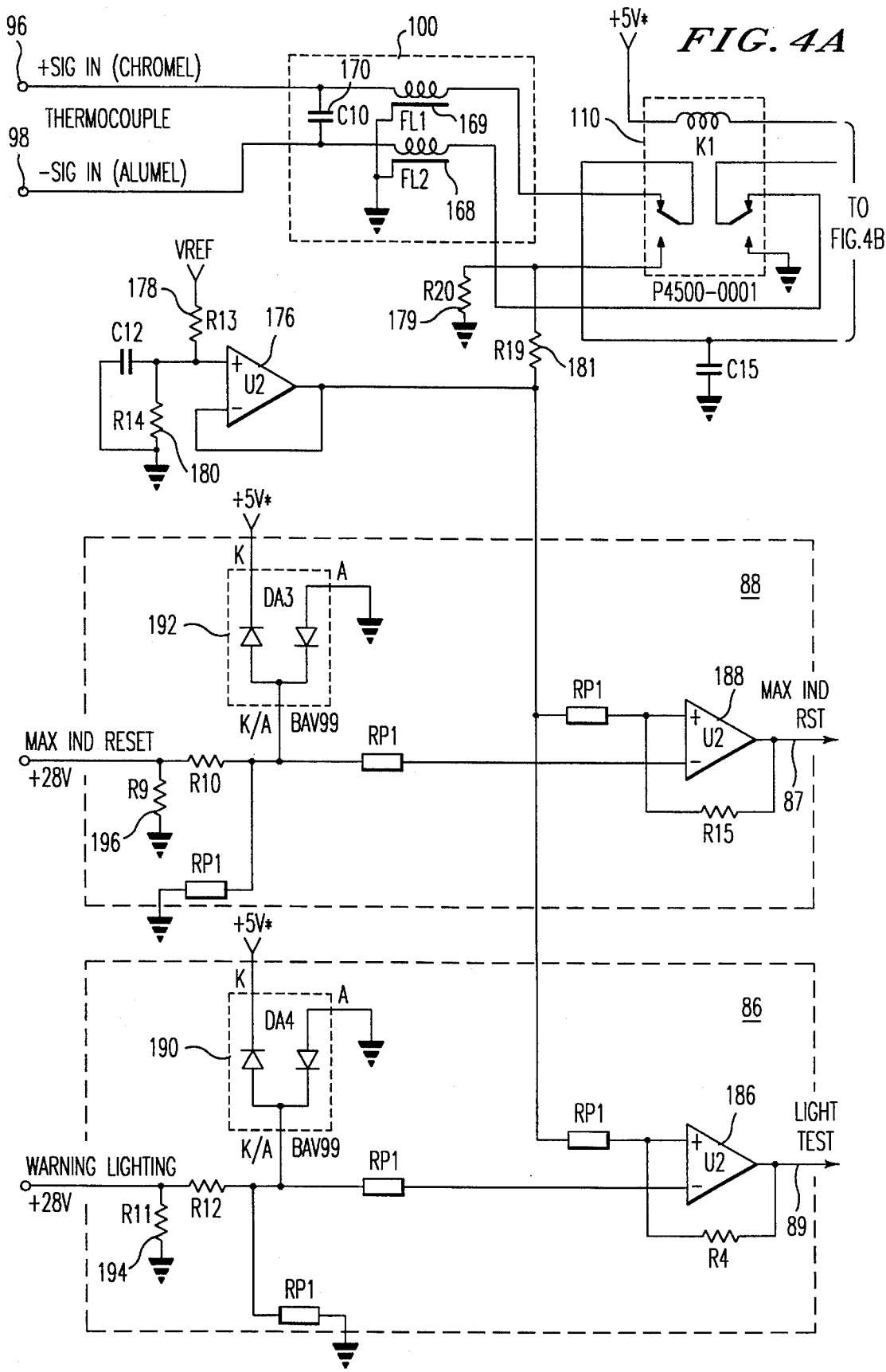
FIG. 4 is schematic diagram of input circuits used in the exhaust gas temperature indicator.
Figure 4B:
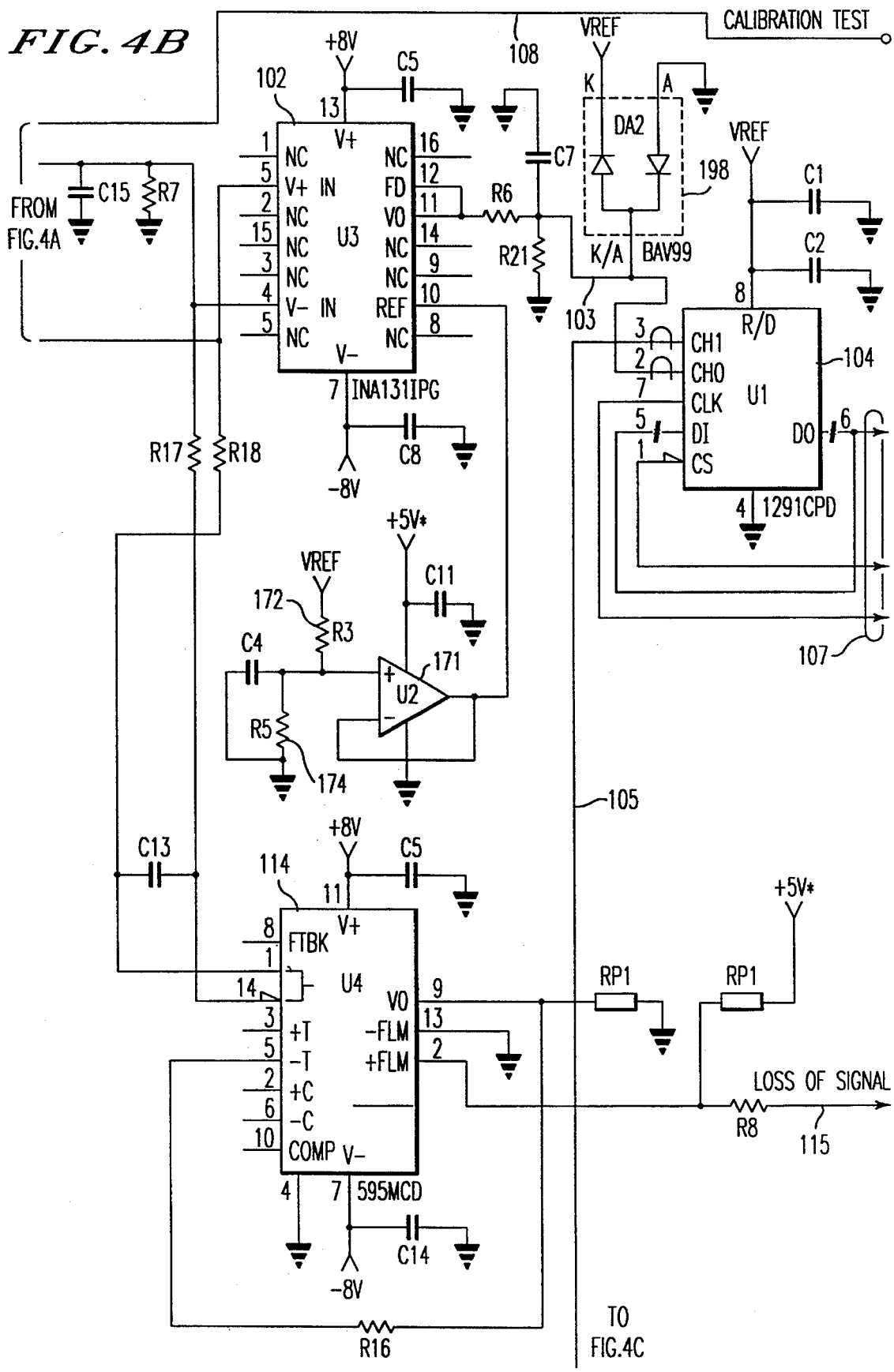
Figure 4C:
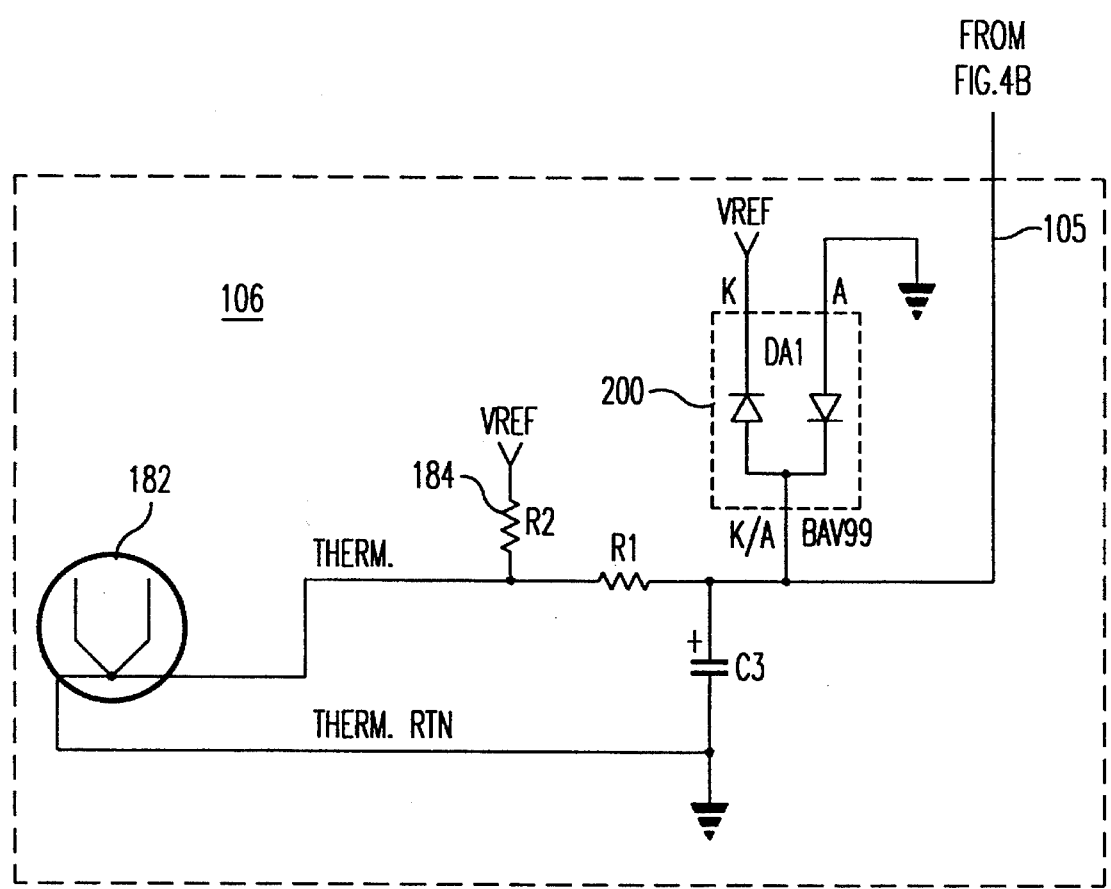

FIG. 4 is a detailed schematic diagram of the microcontroller input circuits which are coupled to the input lines 83, 85, 96 and 98 of FIG. 3A. The chromel and alumel thermocouple inputs 96 and 98 are connected to the inputs of the signal conditioning circuit 100, which comprises filters 168, 169 and capacitor 170 connected as shown. The relay 110 connects the outputs of the signal conditioning circuit 100 to the inputs of the signal amplifier 102, which comprises a Burr-Brown Type INA131 precision amplifier with a fixed gain of 100. The input signal to this circuit is amplified 100 times and added to the reference voltage provided by an amplifier 171 with input resistors 172, 174 forming a voltage divider. The amplifier 171 is connected in a unity-gain configuration as shown. When the contacts of the relay 110 are in the position opposite to that shown, the inputs of the signal amplifier 102 are coupled to a precise DC reference voltage generated by a unity-gain amplifier 176 having voltage divider resistors 178, 180 at its input and voltage divider resistors 179, 181 at its output. The output of the signal amplifier 102 is connected to one input channel of the A/D converter 104, which is a Linear Technology Type LTC1291 12-bit successive approximation A/D converter with a serial output 107. The output and timing of the control signals are under the control of the microcontroller 90 of FIGS. 3A and 3B. The diode arrays 198 and 200 protect the first and second input channels of the A/D converter against undesirable voltage transients. The second input channel of the A/D converter 104 is connected via line 105 to the thermistor cold junction circuit 106. The signal from the reference thermistor 182 is connected to a known reference voltage through a resistor 184, with the thermistor 182 and resistor 184 thus forming a voltage divider circuit whose output is connected to the second input channel of the A/D converter 104. The chromel and alumel thermocouple outputs from the relay 110, in addition to being connected to the signal amplifier 102, are also connected in parallel to the inputs of the signal loss detector 114. The signal loss detector 114 comprises an Analog Devices Type AD595 thermocouple amplifier with cold junction compensation for producing an alarm output on line 115 when one or both of the thermocouple input signals are lost. The alarm output on line 115 is connected to an input of the microcontroller 90 in FIG. 3A.

With continued reference to FIG. 4, the digit and lamp test circuit 86 and the maximum EGT indication reset circuit 88 are substantially identical to each other. In these circuits, operational amplifiers 186, 188 act as comparators for comparing a DC reference voltage applied to the non-inverting input with an input voltage applied to the inverting input. The input voltage results from the application of the 28 volt DC aircraft power supply to the circuit through the remote momentary switches 83 and 85. The diode arrays 190 and 192 prevent the circuitry from being exposed to undesirable voltage transients, and the resistors 194 and 196 provide a low signal when the switches are open. The reference voltage that is applied to the non-inverting inputs of the operational amplifiers 186 and 188 is obtained from the output of the unity-gain amplifier 176 described previously.

Figure 5A:
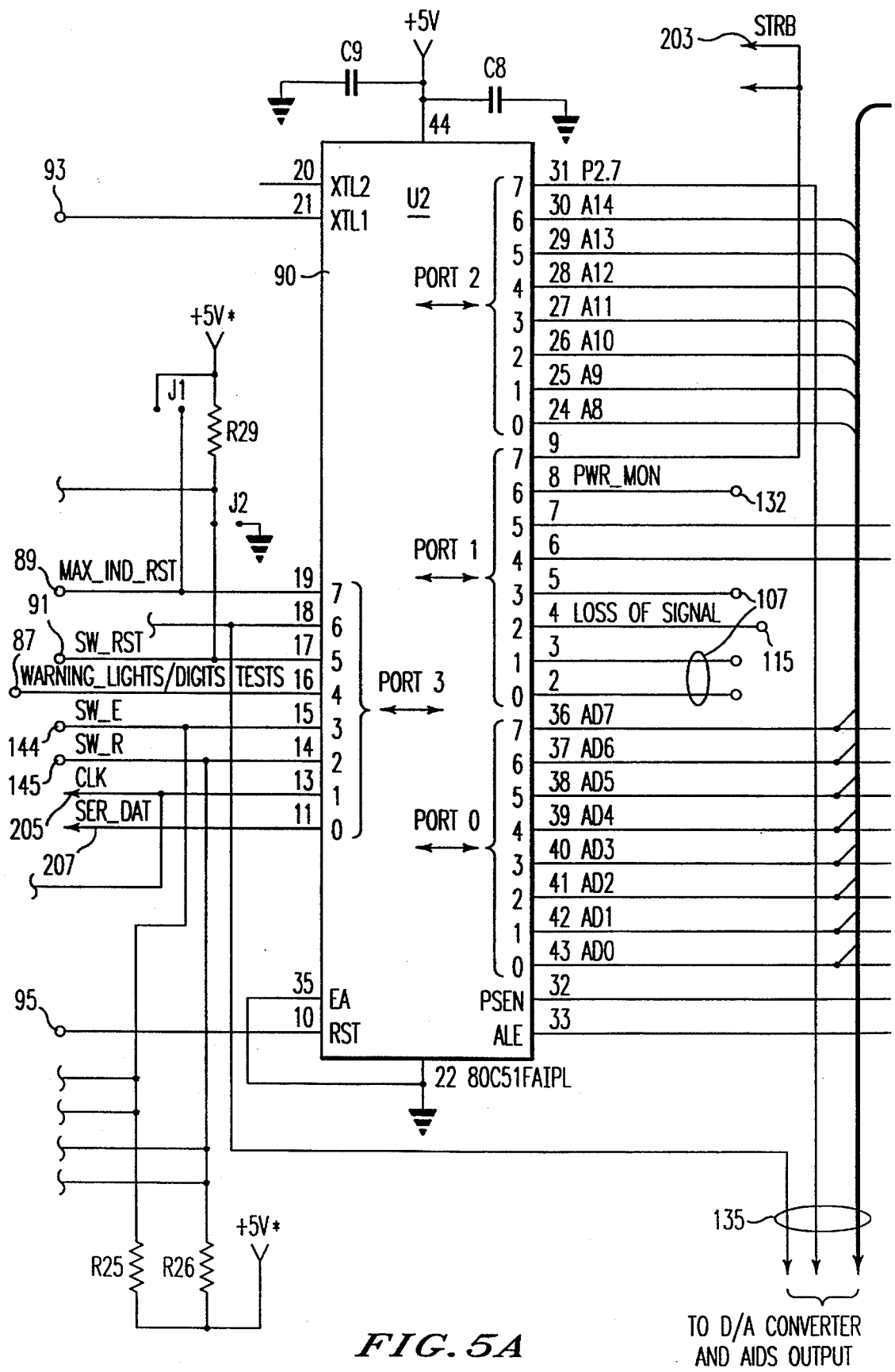
FIG. 5 is a schematic diagram of processor circuitry used in the exhaust gas temperature indicator.
Figure 5B:
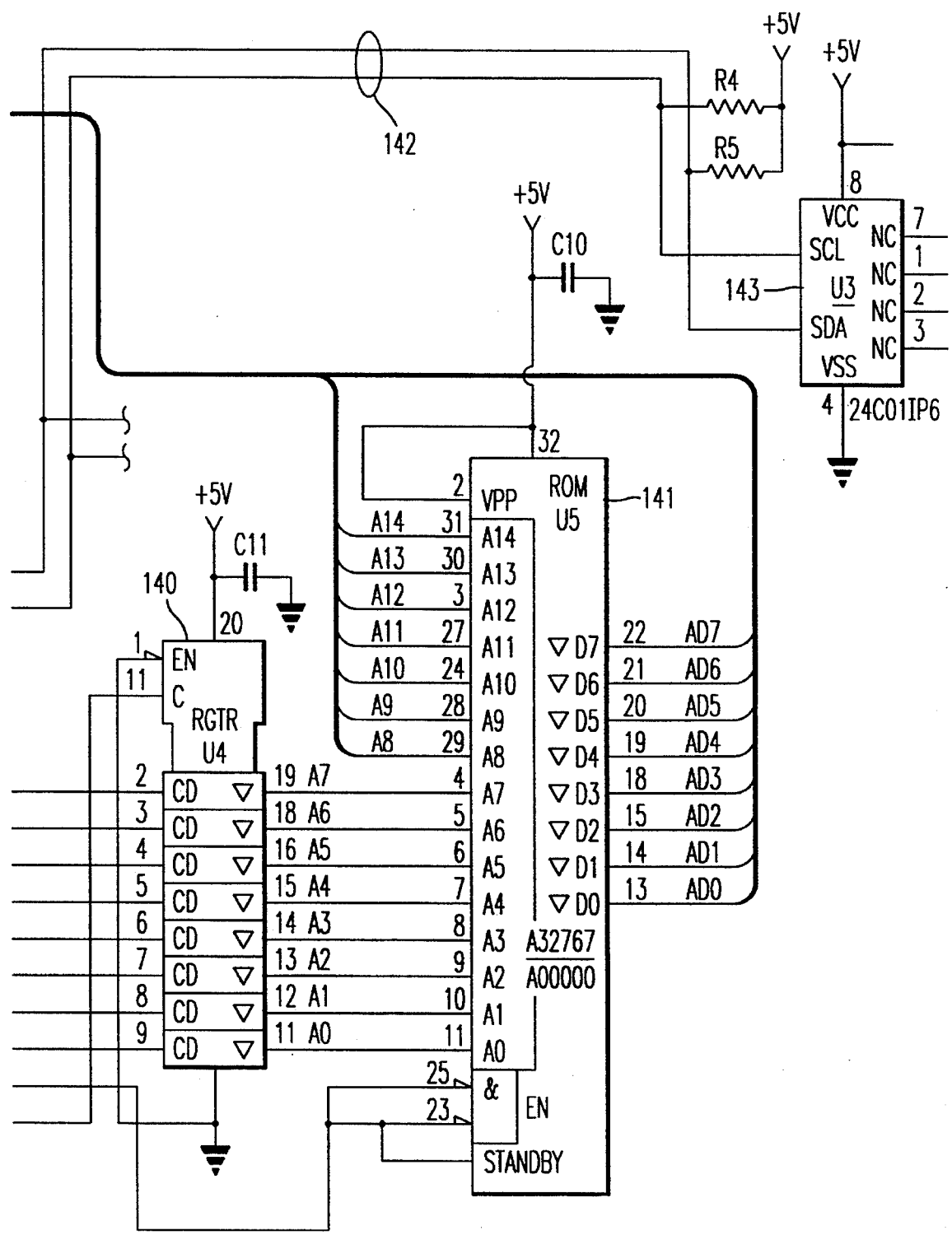

FIG. 5 is a detailed schematic diagram of the microcontroller 90 of FIG. 3A and the associated latch 140 and storage devices 141, 143 of FIG. 3B. The microcontroller 90 is an Intel Type 80C51FA microcontroller which operates at 12 MHz. The processor input is either in the form of serial digital data or in the form of frequency. Port 0 of the microcontroller is multiplexed to contain the 8-bit data bus and the lower 8 bits of the address bus. Port 2 contains the upper 8 bits of the address bus. Ports 1 and 3 of the microcontroller are used to communicate with other subassemblies of the exhaust gas temperature indicator 20. The serial ports of the microcontroller (3.0 and 3.1) are used to control the stepper motor and display functions of the indicator 20, as will be described below in connection with FIGS. 6 and 7. Clocking of the data is controlled by the processor at a rate of 1 MHz. The latch 140 is a Type 74HC573 D-type latch and is used to latch the lower 8 bits of the address bus from the multiplexed address/data bus in order to address the programmable read-only memory 141. The programmable read-only memory (PROM) 141 is a Type 27C256-2 nonerasable device which is used for storing software codes and tables. The PROM 141 is capable of storing 32K bytes of information and has an access time of 200 nanoseconds. The PROM 141 is addressed by the lower address bits held in the latch 140 and by the upper address bits received directly from the microcontroller 90, and receives data from the multiplexed address/data bus. No external random-access memory (RAM) is used, since the microcontroller 90 has 256 bytes of internal random-access memory. Ports 1.4 and 1.5 of the microcontroller 90 are serial clock and data lines and are used to communicate serially with the electrical erasable programmable read-only memory (EEPROM) 143. The EEPROM is preferably a Type 24C01 device and functions as a nonvolatile memory to store overtemperature event data and other data used in the operation of the exhaust gas temperature indicator 20. With available types of EEPROM devices, the minimum duration of data retention in the memory can be 10 years or more. The stored overtemperature data can be retrieved after the indicator 20 has been powered-down and then powered up again, and the data may be erased after it has been reviewed by the aircraft flight crew. The stored data is received and transmitted serially between the microcontroller 90 and EEPROM 143 over the clock and data lines 142. The standby power output from the +5 volt DC regulator 124 of FIG. 3A allows data to be transferred from the microcontroller RAM 97 to the EEPROM 143 after input power is removed from the exhaust gas temperature indicator 20.

Figure 6:
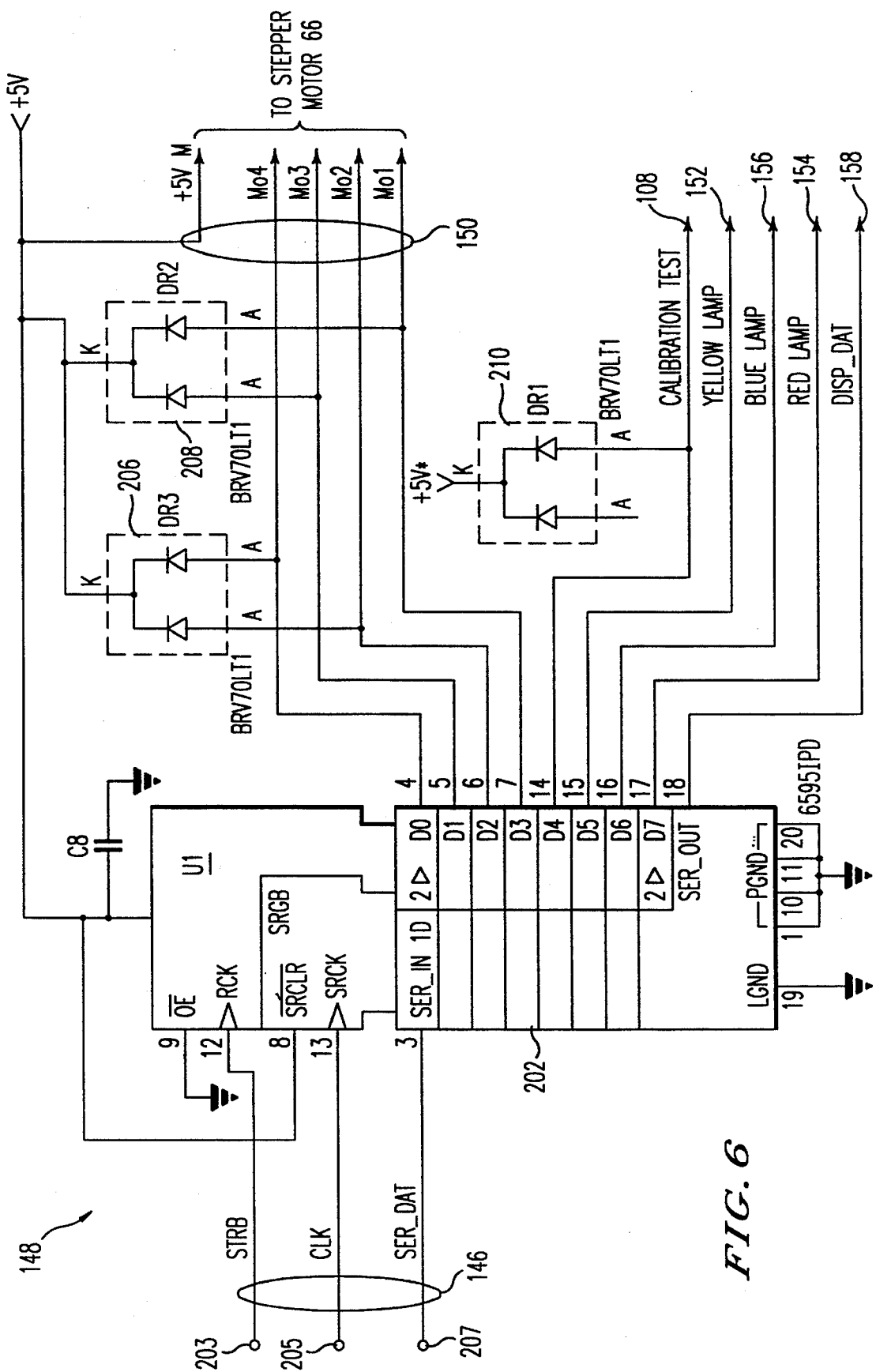
FIG. 6 is a schematic diagram of lamp and motor drive circuitry used in the exhaust gas temperature indicator.

FIG. 6 is a detailed schematic diagram of the lamp and motor drive circuit 148 used in the exhaust gas temperature indicator 20. The principal element of this circuit is a Texas Instrument Type TPIC6595 high-power, 8-bit shift register 202. The shift register 202 is connected to the strobe (STRB), clock (CLK) and serial data (SER_DAT) outputs 203, 205 and 207 from the microcontroller 90 of FIG. 5. The shift register converts the serial data input to an 8-bit parallel output capable of delivering a continuous 250-milliampere current to eight individual loads. The eight outputs are low-side, open-drain transistors. The lower four outputs (D0-D3) of the shift register 202 are connected to the four phases (Mφ1-Mφ4) of the stepper motor 66, and the higher four outputs (D4-D7) are used to drive the lamps 26, 28 and 36 of FIG. 3B and the relay 110 of FIG. 3A. In addition, the serial data being shifted through the shift register 202 is available at the output 158 so that it can serve as an input to the digit driver circuits 160 of FIG. 7 as described below. Flyback diodes 206 and 208 are connected across the motor windings to prevent voltage transients from developing. A diode 210 is connected across the coil of the relay 110 to suppress high voltage switching transients.

Figure 7:
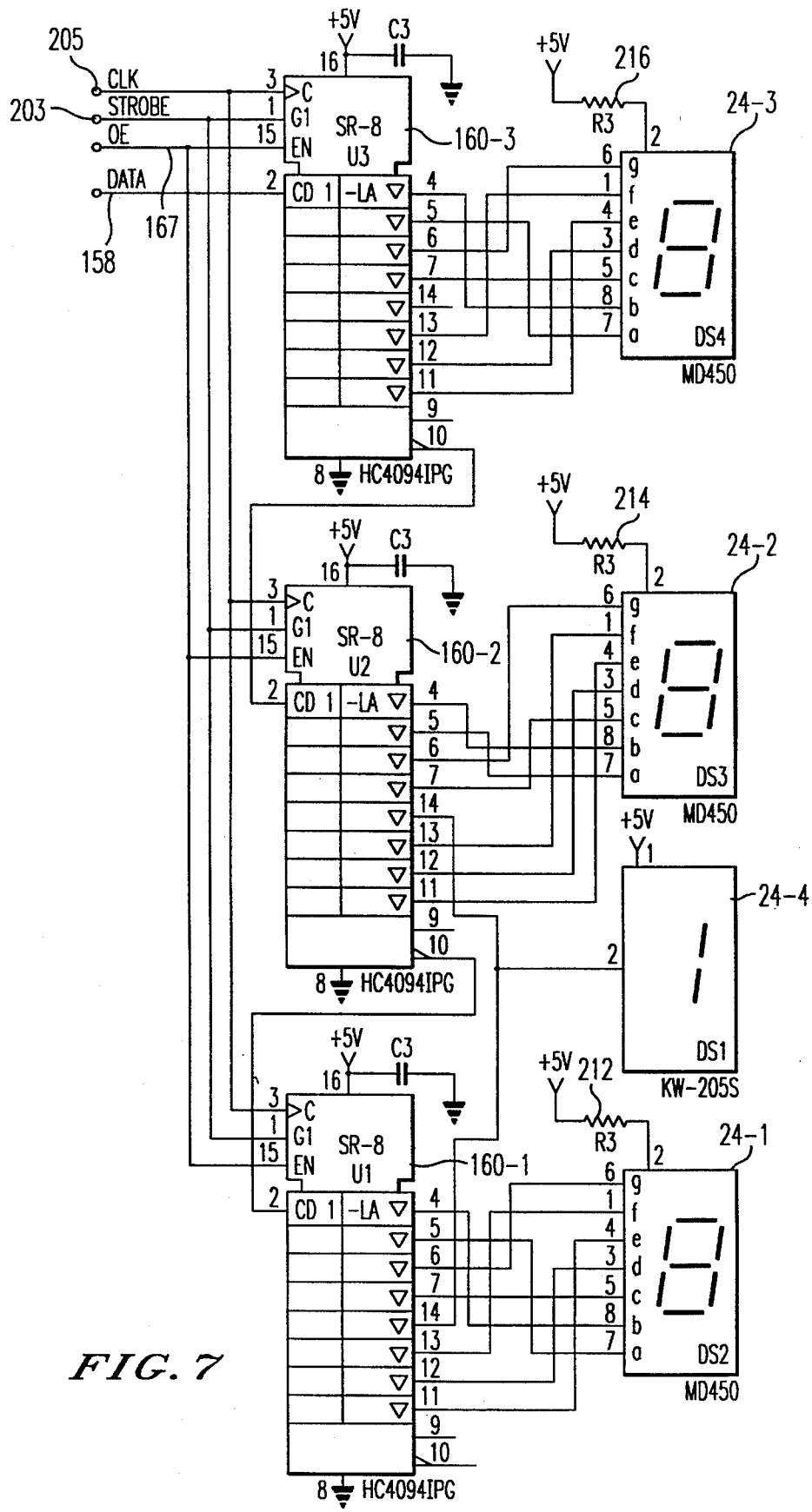
FIG. 7 is a schematic diagram of character display circuitry used in the exhaust gas temperature indicator.

FIG. 7 is a detailed schematic diagram of the serial-to-parallel digit drivers 160 of FIG. 3B. This circuitry receives serial display data at the 1 MHz rate from the output 158 of FIG. 6 and converts it to parallel format for three 7-segment display units 24-1 through 24-3 and a 2-segment display unit 24-4. The digit drivers 160-1 through 160-3 are Type 74HC4094 serial-to-parallel shift registers with storage latches for strobing data to parallel buffered outputs. Each output is capable of handling 20 milliamperes of current. The Q5 outputs of the digit drivers 160-1 and 160-2 are used to drive the 2-segment display 24-4, which provides the leading "one" digit. This output is at a low logic level for displaying the digit "one", and is at a high logic level when no digit is displayed. The serial data at the output 158 is sent to the digit drivers in the order 160-3, 160-2 and finally 160-1. The 7-segment display units 24-1 through 24-3 are preferably PinLite Type MD450 or Wamco Type KW-205S incandescent digital displays, and the 2-segment digital display unit 24-4 preferably comprises a Wamco Type KW-205S-L1 incandescent digital display. Resistors 212, 214 and 216 are used to limit the current applied to the display segments.

It should be understood that the incandescent type digital display units 24-1 through 24-4 comprise merely one example of a character display that may be used in the exhaust gas temperature indicator 20 of the present invention. Other examples include liquid crystal display (LCD) elements or panels, light-emitting diode (LED) arrays, cathode ray tube (CRT) displays, plasma and gas discharge displays, and other types of illuminated and non-illuminated display devices. Similarly, the type of character information that is displayed may be varied to suit particular applications. The character information may, for example, comprise digital or numerical characters, alphabetical characters, or a combination thereof (i.e., alphanumeric data). Symbolic characters, pictograms and icons may also be used if desired, either alone or in combination with digital, alphabetical or alphanumeric characters.

Figure 8:
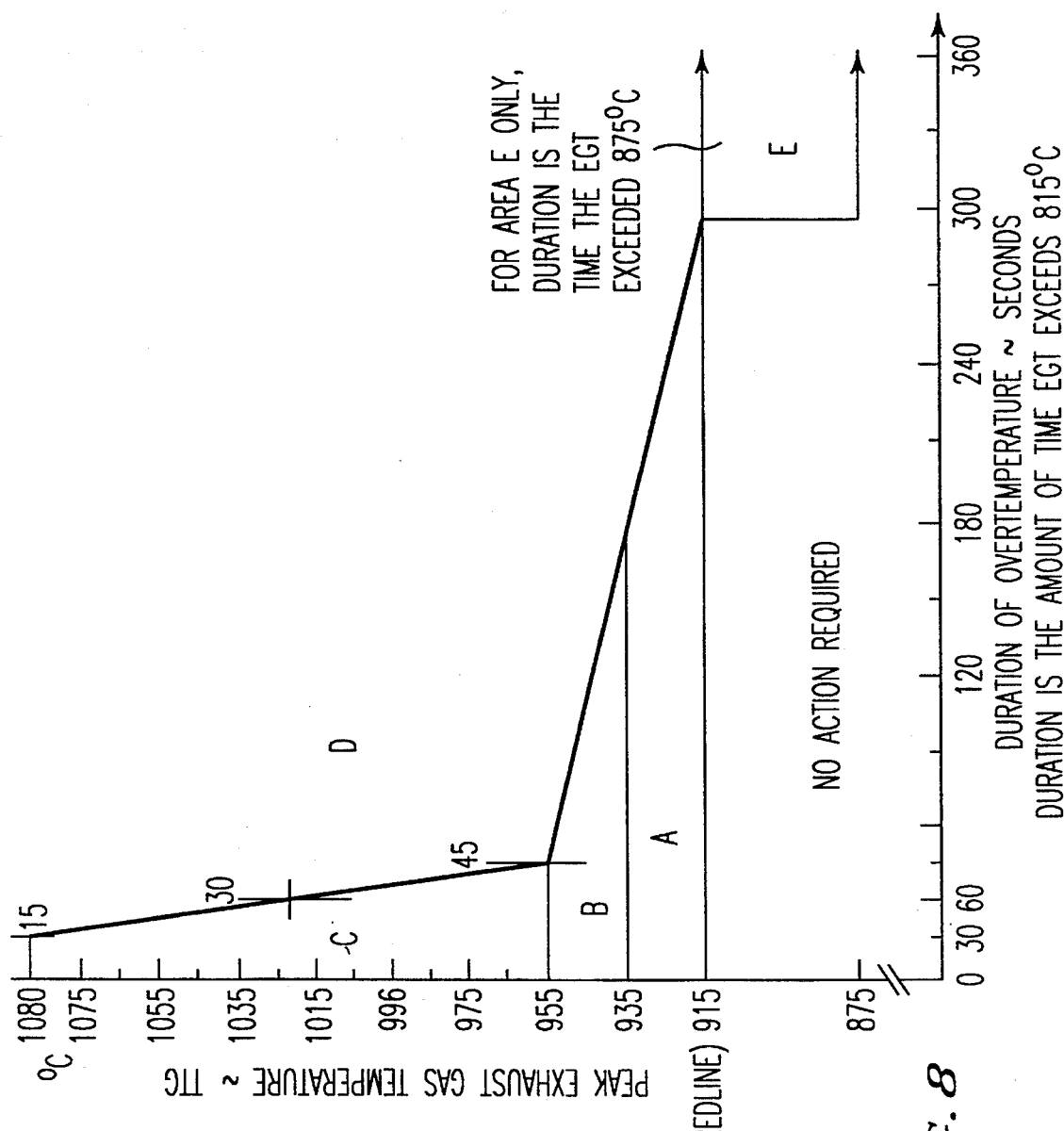
FIG. 8 is a graph of temperature versus time illustrating several different overtemperature zones which are monitored by the exhaust gas temperature indicator.

FIG. 8 is a graph of temperature versus time illustrating various overtemperature zones which are monitored by the exhaust gas temperature indicator 20. The particular graph shown is for Pratt and Witney Type JT9D-7, JT9D-7A and JT9D-7AH gas turbine engines, although it will be understood that other graphs may be used for different engines or manufacturers are involved. For the particular engines maintained, the indicator 20 records EGT readings in excess of 915° Celsius (C) for any duration, and EGT readings in excess of 875° C. for a duration of 300 seconds or more. These readings are stored and retrieved as discrete overtemperature events by means of the EEPROM 143 of FIG. 3B, under the control of the microcontroller 90. In the preferred embodiment, the indicator 20 distinguishes among five different overtemperature zones A through E as illustrated in FIG. 8. Zone A represents an overtemperature event in which the peak temperature is in excess of 915° C. but less than or equal to 935° C. Zone B represents an overtemperature event in which the peak temperature is in excess of 935° C. but less than or equal to 955° C. Similarly, zone C represents an overtemperature event in which the peak temperature is in excess of 955° C. but less than or equal to 1090° C. For each discrete temperature level within the zones A, B and C, there is a maximum duration in seconds (represented by the right-hand border of each zone) after which the overtemperature event will be considered to fall into zone D. When these limits are exceeded, the overtemperature event becomes a zone D event. Thus, for example, if the EGT is in excess of 1020° C. for more than 30 seconds, the overtemperature event will be regarded as a zone D event rather than as a zone C event. Zone D also includes overtemperature events of any duration if the peak temperature reading is in excess of 1090° C. There is an additional overtemperature zone, labeled as zone E in FIG. 8, which corresponds to an overtemperature occurrence of more than 875° C. but less than or equal 915° C. for a duration of 300 seconds or more. In other words, overtemperature events between 875° C. and 915° C. are not recorded unless they persist for 300 seconds or more, and the recorded duration will have a minimum value of 300 seconds. By contrast, overtemperature events in excess of 915° C. are recorded regardless of duration, and these events will fall into one of the zones A, B, C or D. The recorded zone for a particular overtemperature event corresponds to the peak EGT value attained during that event. For example, if the EGT reaches a peak value of 975° C., a single event in zone C (or zone D, depending on the duration of the event) will be recorded along with a peak temperature value of 975°. The EGT values in zones A and B will not be counted as separate events in that situation. If the EGT then returns to the normal range and later rises and peaks at 945° C., this will be recorded as a separate event in zone B or D.

The data that is recorded in the EEPROM 143 of FIG. 3B for each discrete overtemperature event comprises the peak temperature in °C. attained during the overtemperature event and the duration of the overtemperature event in seconds (with a minimum duration of 300 seconds for a zone E event). The zone of the overtemperature event (i.e., A, B, C, D or E) is inferred by the microcontroller 90 from the stored duration and peak temperature data, and hence is not stored in the EEPROM 143 to maximize storage efficiency. Similarly, since overtemperature events are stored in the EEPROM 143 in the order of their occurrence, a sequential event number for each overtemperature event is inferred by the microcontroller 90 during retrieval and need not be stored in the EEPROM 143 as a separate value. In addition to the duration and peak temperature data, the EEPROM 143 also stores other information used in the operation of the exhaust gas temperature indicator 20. A preferred allocation of bytes within the EEPROM 143 is provided in Table 1 below:

TABLE 1

| Bytes | EEPROM Storage Allocation Significance |
|---|---|
| 13 | EEPROM signature. |
| 2 | Maximum flight EGT. |
| 1 | Write in progress flag. |
| 1 | Next event pointer. |
| 80 | Circular queue of 20 latest events. |
| 7 | EGT input signal calibration offsets. |
| 7 | AIDS output calibration offsets. |
| 1 | EEPROM test byte. |

The EEPROM signature in Table 1 is used by the microcontroller 90 on initial power-up to initialize the contents of the EEPROM 143, and also to indicate the current version of software that is used in the exhaust gas temperature indicator 20. The maximum flight EGT represents the maximum EGT value recorded during the previous flight of the aircraft, and can be reviewed by the flight crew along with stored overtemperature data. The write in progress flag is used to indicate that a failure has occurred during the transfer of data to the EEPROM following a power down condition, and hence that any stored data should be considered unreliable. The next event pointer is used to indicate the next location for overtemperature event data during storage and retrieval operations. The circular queue or buffer of overtemperature events comprises 20 locations of 4 bytes each, with 2 bytes for peak temperature (in °C.) and 2 bytes for duration (in seconds). These locations are accessed sequentially during storage and retrieval, and the microcontroller 90 interprets the number of non-zero stored values as the number of overtemperature events which have been stored. When the circular queue is full, subsequent events are written over previous events beginning with the first buffer location, and the next event pointer is used to indicate the next buffer location which is to be replaced with new data. The calibration offset values are used in deriving EGT readings and AIDS output values, and the EEPROM test byte is used to test the read and write functions of the EEPROM 143 during a self-test procedure that occurs during each power-up operation.

The overtemperature event data and maximum flight EGT stored in the EEPROM 143 can be retrieved on demand by the flight crew by operating the EVENT and RECALL pushbuttons 32 and 34 of FIG. 1A, and displayed on the digital display 24. During the memory retrieval operation, the analog pointer 22 continues to display the current EGT and the overtemperature caution and warning lamps 26 and 28 continue to operate normally. In this way, new overtemperature events can be brought immediately to the attention of the flight crew even during intervals when the digital display 24 is being used to review previously stored data.

Figure 9A:
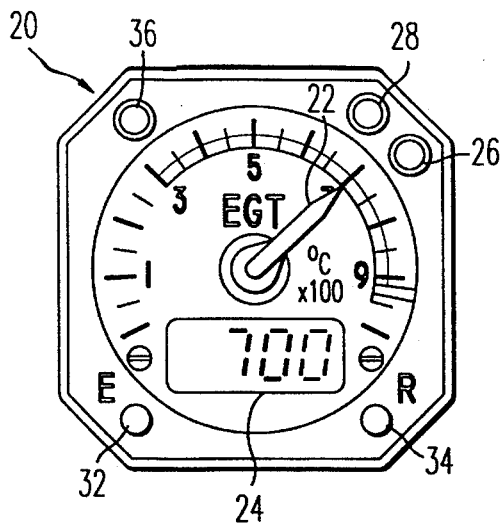
FIGS. 9A–9F are sequential views of the gauge face of the exhaust gas temperature indicator, illustrating the manner in which various temperature conditions are indicated.
Figure 9B:
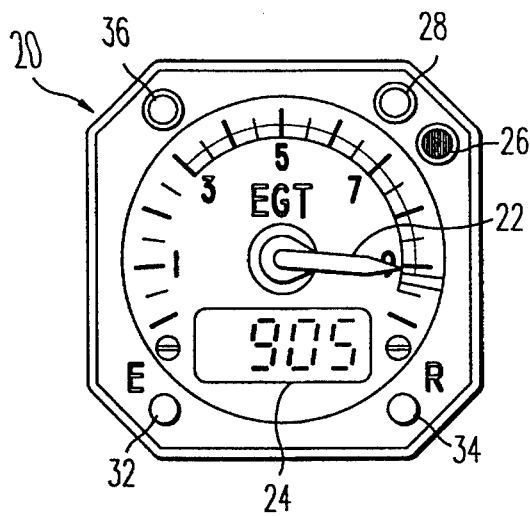
Figure 9C:
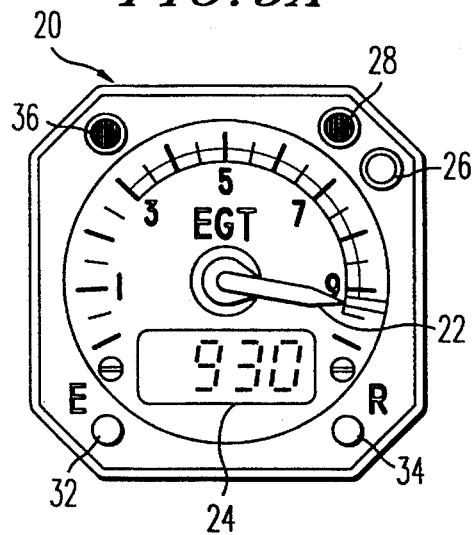
Figure 9D:
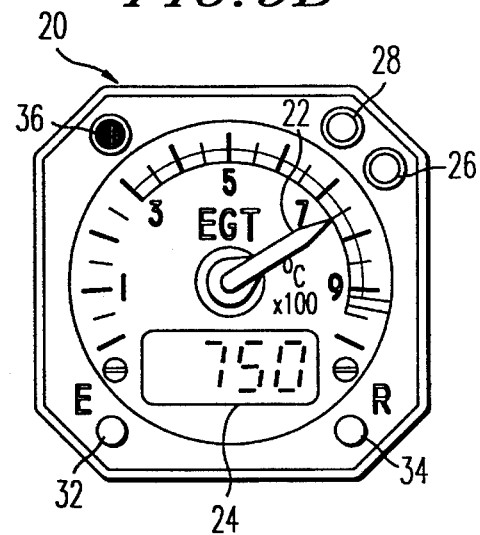
Figure 9E:
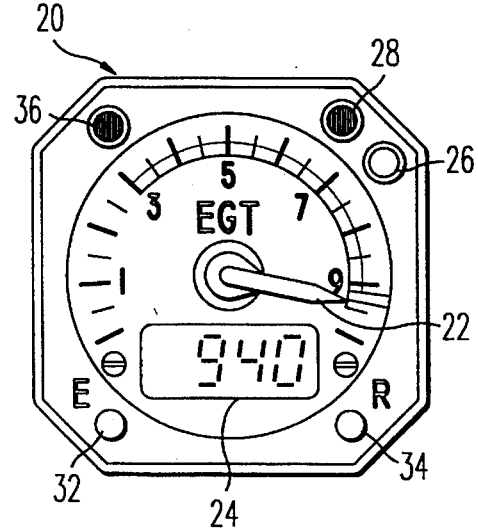
Figure 9F:
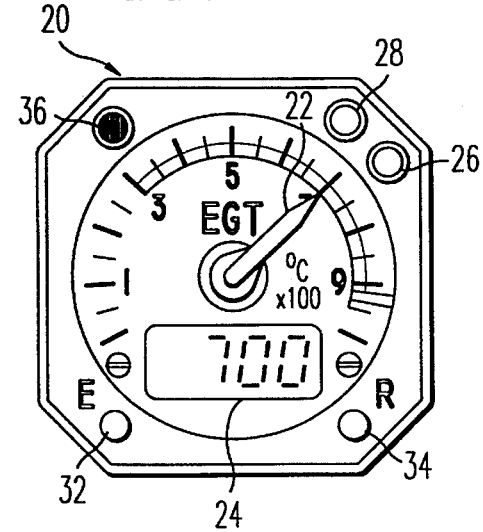

FIGS. 9A through 9F are sequential views of the gauge face of the exhaust gas temperature indicator 20, illustrating the manner in which various types of normal and overtemperature conditions are indicated. FIG. 9A illustrates the normal operating mode in which the indicated EGT of 700° C. is within the normal range. The analog pointer 22 and character display 24 both show the current EGT reading, and none of the lamps 26, 28 or 36 is illuminated. In FIG. 9B, the EGT has risen to 905° C. as indicated by the analog pointer 22 and digital display 24. This does not represent an overtemperature event (unless it persists for more than 300 seconds), but the amber overtemperature caution lamp 26 illuminates to indicate that the EGT is in the caution range. In FIG. 9C the EGT has risen further to 930° C., which exceeds the maximum allowable (red line) temperature. Under these conditions, the amber overtemperature caution lamp 26 is extinguished and the red overtemperature warning lamp 28 is illuminated to indicate to the flight crew that an overtemperature event is in progress. In addition, the blue overtemperature event lamp 36 is illuminated at the start of the overtemperature event to indicate the data relating to the event is being stored in memory for later retrieval, although the data cannot be retrieved until the event is completed. The blue overtemperature lamp 36 will remain illuminated until the data is retrieved by the flight crew by operating the EVENT and RECALL pushbuttons 32 and 34 as described below. In FIG. 9D, the EGT has returned to a temperature of 750° C., which is within the normal range. This signifies the overtemperature event is complete. Thus, the red overtemperature warning lamp 28 is extinguished but the blue overtemperature event lamp 36 remains illuminated to indicate to the flight crew that stored overtemperature event data is present. In FIG. 9E, the EGT has risen again to 940° C. and hence a second overtemperature event is in progress. The red overtemperature warning lamp 28 is illuminated for as long as the EGT remains at 915° C. or above, and is then extinguished. The overtemperature event lamp 36 remains illuminated to indicate that the previously stored overtemperature event (and now an additional overtemperature event) is stored in memory and has not yet been reviewed and acknowledged by the flight crew. In FIG. 9F, the EGT has returned to a normal value of 700° C., with the caution and warning lamps 26 and 28 extinguished and the overtemperature event lamp 36 remaining illuminated.

Figure 10A:
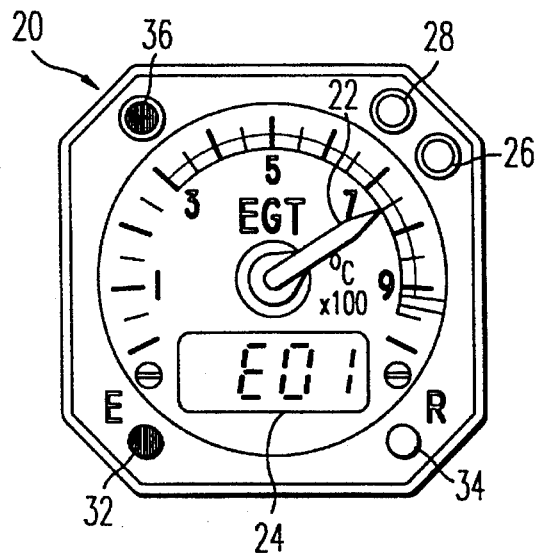
FIGS. 10A–10H are sequential views of the gauge face of the exhaust gas temperature indicator, illustrating the manner in which discrete overtemperature events are retrieved and displayed on an event-by-event basis.
Figure 10B:
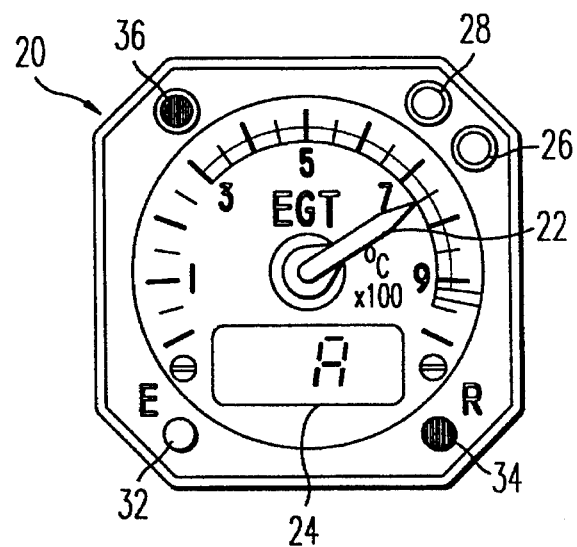
Figure 10C:
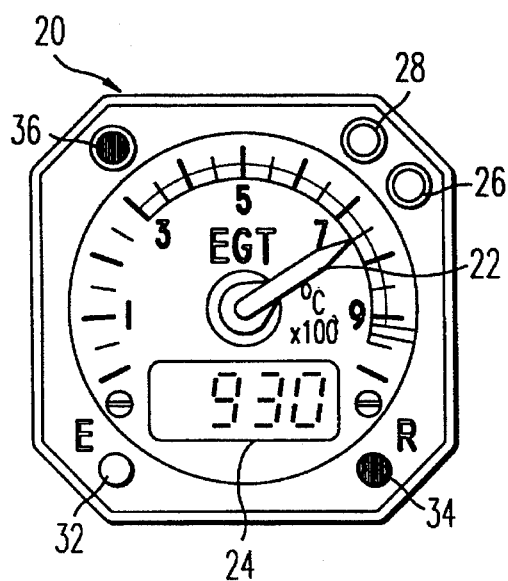
Figure 10D:
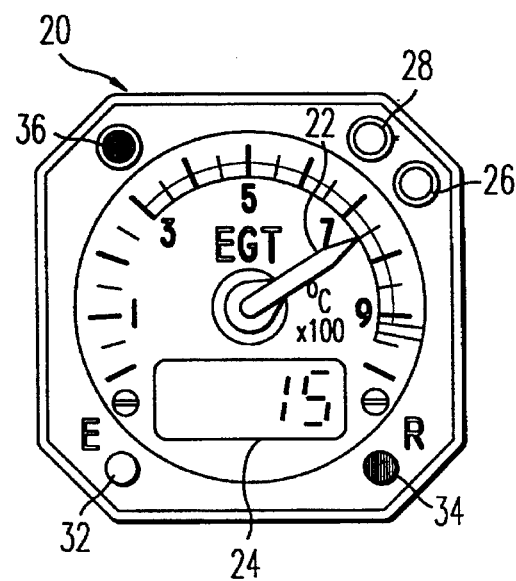
Figure 10E:
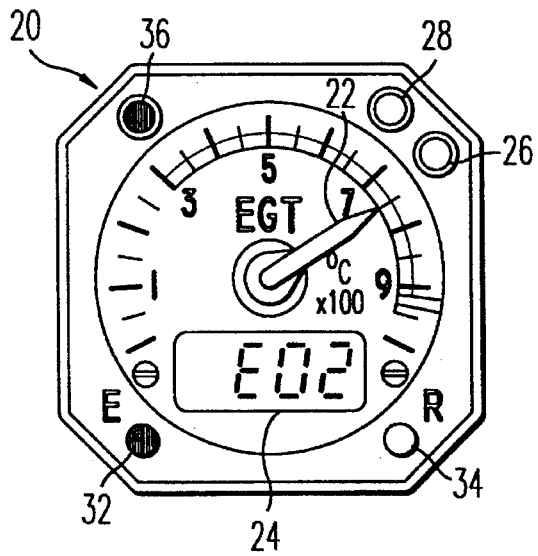
Figure 10F:
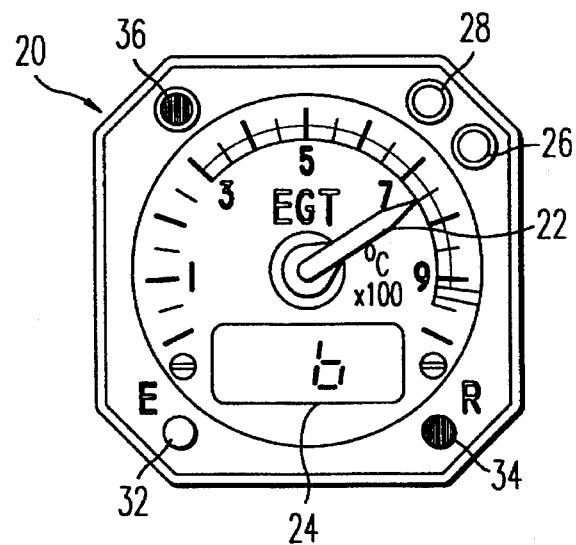
Figure 10G:
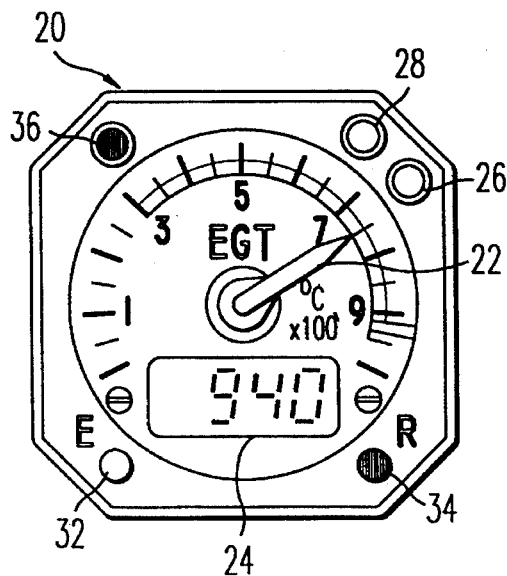
Figure 10H:
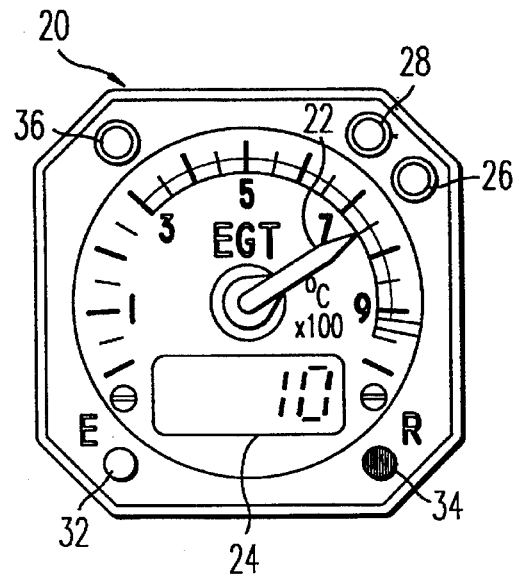

FIGS. 10A through 10H are sequential views of the gauge face of the exhaust gas temperature indicator 20, illustrating the manner in which the discrete overtemperature events that occurred in FIGS. 9A through 9F are later retrieved and displayed on an event-by-event basis. Referring first to FIG. 10A, the retrieval operation is initiated by depressing the EVENT pushbutton 32, which causes the digital display 24 to indicate the event number E01 of the first stored overtemperature event. The RECALL pushbutton 34 is then depressed as shown in FIG. 10B, causing the digital display to indicate that the first stored overtemperature event occurred in temperature zone A. The RECALL pushbutton 34 is depressed again as shown in FIG. 10C, causing the digital display 24 to indicate the peak EGT of 930° C. for the first overtemperature event. The RECALL pushbutton 34 is then depressed once again as shown in FIG. 10D, causing the digital display 24 to read out 15 seconds as the duration of the first overtemperature event. All of the stored data corresponding to the first overtemperature event has now been reviewed, and repeated actuation of the RECALL pushbutton 34 will simply cause the indicator 20 to repeat the zone, peak temperature and duration of the first overtemperature event. After this information is reviewed and noted by the flight crew, the EVENT pushbutton 32 is depressed again as shown in FIG. 10E. This causes the digital display 24 to read E02, indicating that data relating to a second discrete overtemperature event has been stored in memory and is available for retrieval. The data relating to the second discrete overtemperature event is then retrieved by repeatedly depressing the RECALL pushbutton 34 as described above. Thus, in FIG. 10F, the first actuation of the RECALL pushbutton 34 causes a lower case B to appear on the digital display 24, indicating that the second overtemperature event had a peak temperature in zone B. The second actuation of the RECALL pushbutton 34 causes the digital display to indicate the peak temperature reading of 940° C. that was achieved during the second overtemperature event, as illustrated in FIG. 10G. Finally, as illustrated in FIG. 10H, the third actuation of the RECALL pushbutton 34 causes the number 10 to appear on the digital display 24, indicating that the duration of the second overtemperature event was 10 seconds.

As indicated in FIGS. 10A through 10H, the analog pointer 22 continues to indicate the current EGT (750° C. in the example illustrated) throughout the memory retrieval operation. In addition, the overtemperature caution and warning lamps 26 and 28 continue to operate normally during this period. Thus, the flight crew is always alerted to new overtemperature events despite the fact that the digital display 24 is being used to review stored data rather than to display the current EGT. It will also be observed from FIGS. 10A through 10H that the overtemperature event lamp 36 remains illuminated during the time that successive overtemperature events are being retrieved from memory, and is not extinguished until all overtemperature events have been retrieved and acknowledged by operating the EVENT and RECALL pushbuttons 32 and 34. Thus, assuming that only two overtemperature events have been stored in FIGS. 9A through 9F, the overtemperature event lamp 36 will be extinguished after the data relating to the second overtemperature event has been retrieved and acknowledged.

In a preferred embodiment of the present invention, the exhaust gas temperature indicator 20 is capable of storing and retrieving data relating to up to 20 discrete overtemperature events. For each event, the stored data includes the peak temperature and duration of the event, and the event numbers and temperature zones are computed by the microcontroller 90 during retrieval based on the stored data. These parameters are displayed in the format indicated in FIGS. 10A–10H. The individual overtemperature events are stored and recalled in the sequence of their occurrence, and the resulting time profile of overtemperature events may be of assistance to the flight crew or maintenance personnel in diagnosing specific types of abnormal engine conditions. Unlike previously available exhaust gas temperature recorders which were designed to record the total accumulated time in a given overtemperature zone, the exhaust gas temperature indicator 20 of the present invention allows the flight crew to distinguish between a large number of brief overtemperature excursions and a smaller number of lengthier overtemperature events. This is helpful in estimating the useful life of a turbine engine and determining when inspection and maintenance procedures are necessary.

Figure 11:
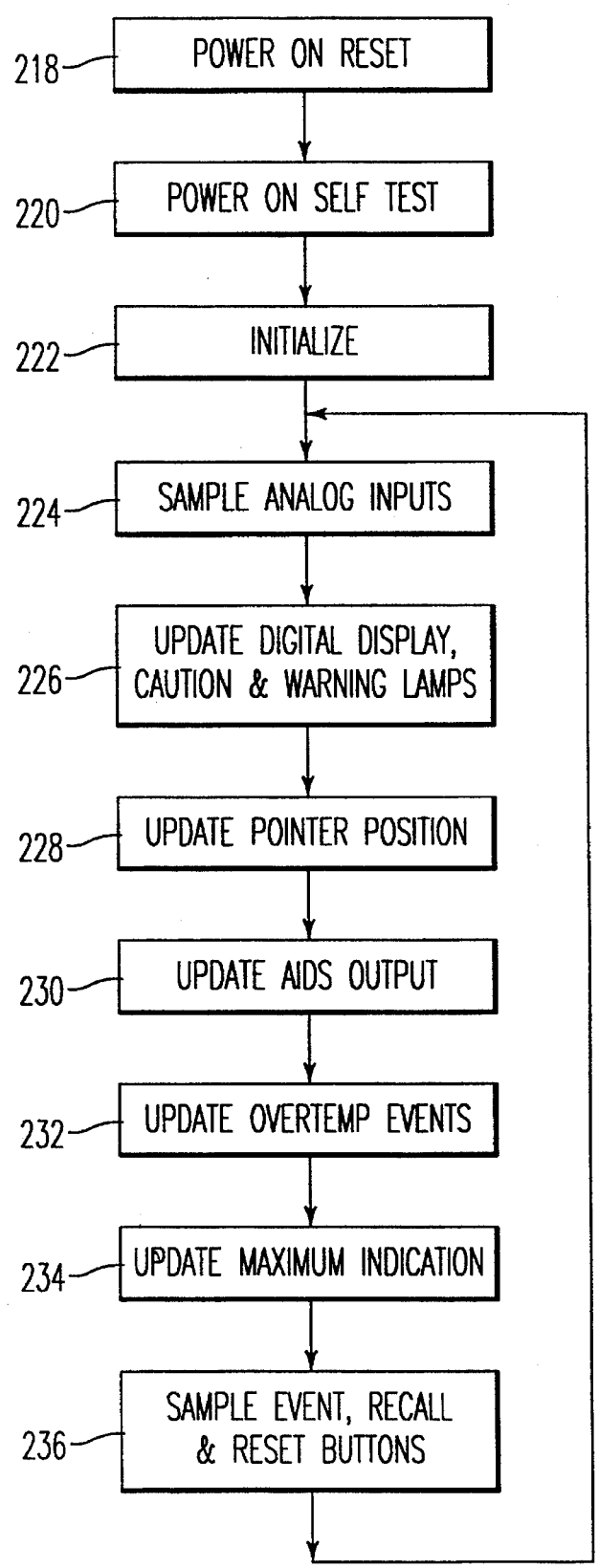
FIG. 11 is a flow chart summarizing the overall sequence of operations carried out by the microcontroller which controls the operation of the exhaust gas temperature indicator.
Figure 12A:
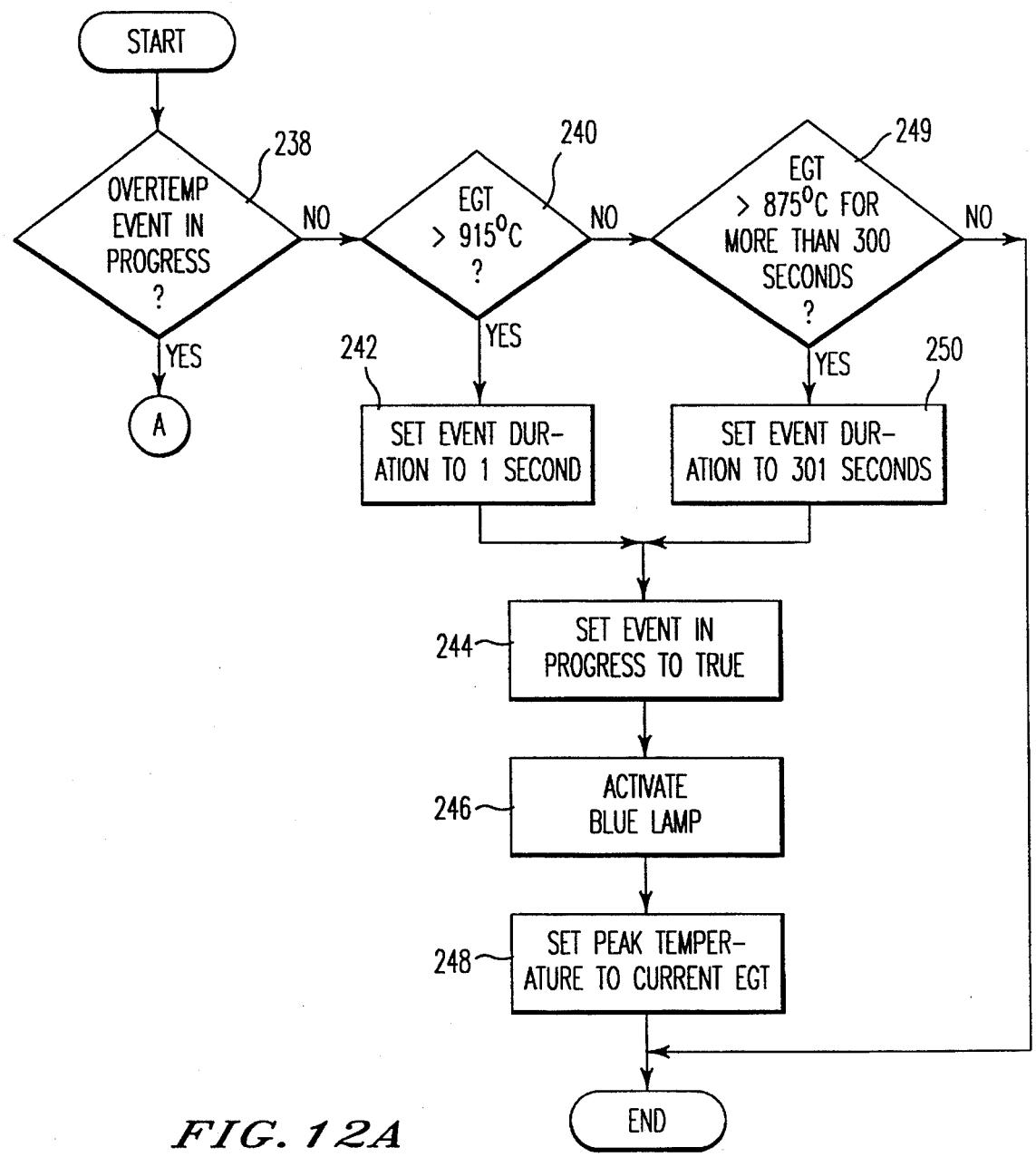
FIGS. 12A and 12B comprise a flow chart of a program routine which is carried by the microcontroller in order to detect and store discrete overtemperature events.
Figure 12B:
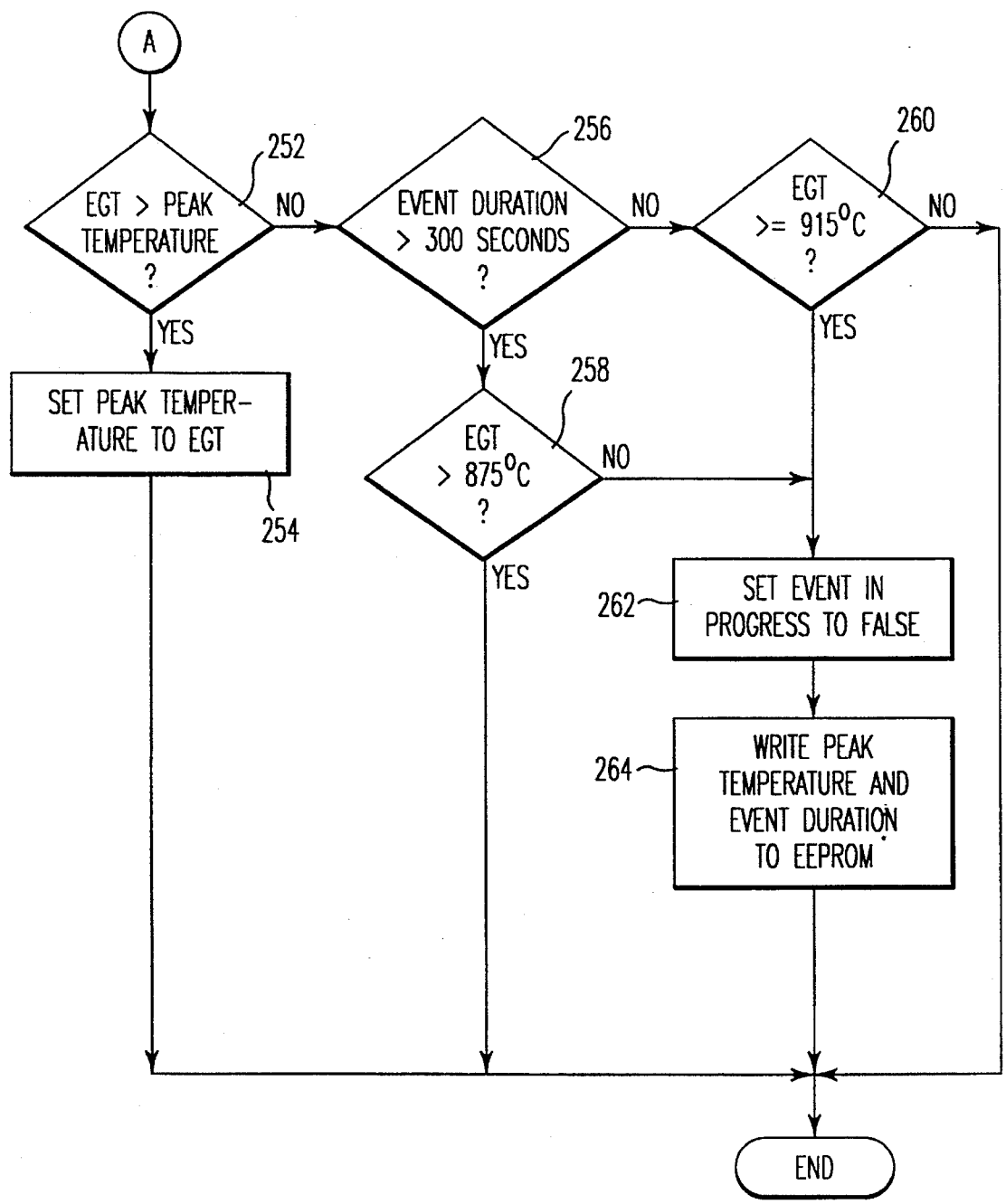
Figure 13:
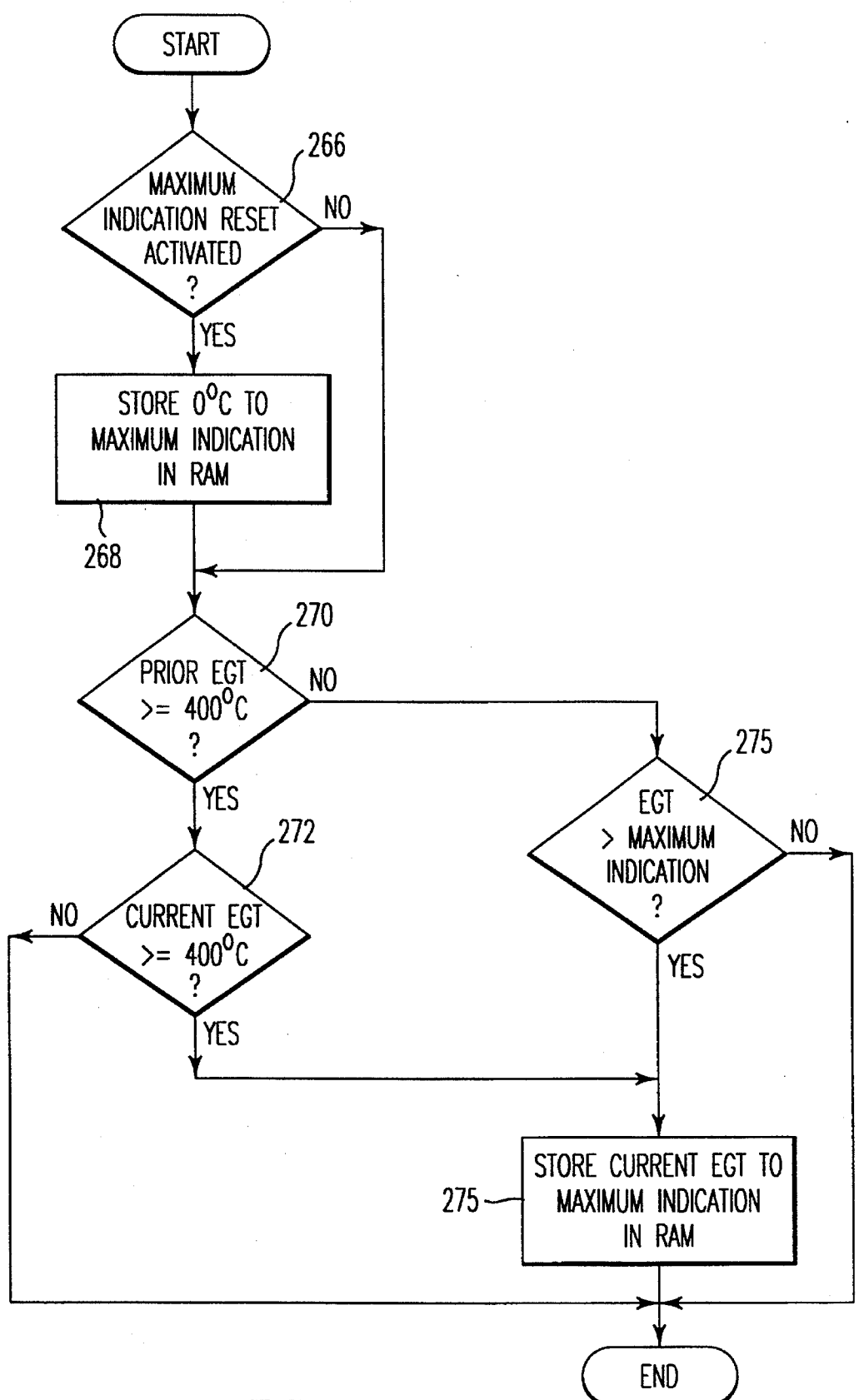
FIG. 13 is a flow chart of a program routine which is carried out by the microcontroller in order to maintain a continuous record of the maximum exhaust gas temperature attained during an aircraft flight.

FIGS. 11–14 are flow charts which describe the operation of the microcontroller 90 of FIGS. 3A and 5 in controlling the principal functions of the exhaust gas temperature indicator 20. FIG. 11 is a top level flow chart which summarizes the overall sequence of operations of the microcontroller, and FIGS. 12–14 are flow charts of individual program routines or modules which carry out specific functions. Referring first to FIG. 11, blocks 218-222 denote an initial power-up program sequence during which the microcontroller carries out various types of reset, self-test and initialization operations. The reset operation in block 218 causes all outputs of the microcontroller 90 to be switched to the off state and the microcontroller memory to be cleared. The self-test operations in block 220 include an on-chip memory test of the microcontroller 90, a checksum verification of the PROM 141, a read/write test of the EEPROM 143, and a test of the analog-to-digital converter 104. Each test is repeated until passed, and dashes are displayed by the digital display 24 if any test fails. The initialization operations in block 222 include starting the system timer, activating a 5-second display and lamp test, resetting the analog pointer 22 to zero, verifying the stored signature in the EEPROM 143, and setting the value of the maximum flight EGT in the microcontroller RAM 97 to the value stored in the EEPROM 143 during the previous flight.

When the reset, self-test and initialization operations of blocks 218-222 operations are completed, the microcontroller enters an endless program loop comprising blocks 224-236. In block 224, the microcontroller samples the analog inputs from the thermocouples associated with the turbine engine and from the reference thermistor. In block 226, the microcontroller uses this information to update the digital display 24 and the overtemperature caution and warning lamps 26 and 28. In block 228, the position of the analog pointer 22 is updated, and the aircraft integrated data systems (AIDS) output is updated in block 230. In block 232, the microcontroller updates the stored overtemperature event data by storing or modifying data in the internal RAM 97 of the microcontroller 90 if an overtemperature event is in progress, and by writing the data to the EEPROM 143 of FIGS. 3B and 5 in the event that the overtemperature event has reached completion. In block 234, the maximum flight EGT is updated in the microcontroller RAM 97; this data is not stored in the EEPROM 143 until the exhaust gas temperature indicator 20 is powered down at the end of an aircraft flight. In block 236, the microcontroller samples the EVENT, RECALL and RESET pushbuttons 32, 34 and 50, respectively, and takes appropriate action in the event that one or more of these pushbuttons have been depressed. Following completion of the operations specified in block 236, the microcontroller returns to block 224 and re-executes the program loop. The blocks 224-236 will be executed repeatedly until power is removed from the exhaust gas temperature indicator 20.

FIGS. 12A and 12B comprise a flow chart of the sequence of operations carried out by the microcontroller 90 when updating the overtemperature event data in the EEPROM 143 (block 232 of FIG. 11). In decision block 238, the microcontroller determines whether an overtemperature event is already in progress by checking the status of an EVENT IN PROGRESS software flag. If the status of this flag indicates that an overtemperature event is not yet in progress, the microcontroller proceeds to decision block 240 and determines whether the current EGT exceeds 915° C. If so, a new overtemperature event in zone A, B, C or D has begun and the microcontroller sets the event duration to 1 second in block 242. In block 244, the EVENT IN PROGRESS flag is set to a true value so that the microcontroller will have an indication that an overtemperature event is already in progress on the next pass through the program routine of FIGS. 12A and 12B. In block 246, the microcontroller illuminates the blue overtemperature event lamp 36 to indicate that an overtemperature event is in progress, and sets a software flag to indicate that overtemperature data is being stored. In block 248, the peak temperature value of the overtemperature event in progress is set to the current EGT.

The microcontroller then returns to the main program routine of FIG. 11. Since the duration and peak temperature values will change continually throughout the overtemperature event, this data is stored in the internal RAM 97 of the microcontroller 90 until the overtemperature event is completed (i.e., until the EGT returns to a normal value). At that point, the duration and peak temperature values corresponding to the event are stored in the EEPROM 143. Currently available EEPROM devices are limited to a finite number of write operations; thus, by deferring the writing of any data to the EEPROM 143 until the overtemperature event is completed, the number of EEPROM write operations is held to minimum and the useful life of this component is increased.

If the microcontroller determines in decision block 240 that the current EGT does not exceed 915° C., an overtemperature event condition is not present unless the EGT continuously exceeds 875° C. for more than 300 seconds (zone E of FIG. 8). If the microcontroller determines in decision block 249 that this condition has not been met, the microcontroller returns to the main program routine of FIG. 11. Otherwise, the microcontroller proceeds to block 250 and sets the duration of the overtemperature event currently in progress to 301 seconds. The microcontroller then executes the steps described previously in connection with blocks 244-248, and returns to the main program routine of FIG. 11.

If the microcontroller determines in decision block 238 of FIG. 12A that an overtemperature event is already in progress as a result of the EVENT IN PROGRESS flag having been set previously in block 244, the microcontroller proceeds to decision block 252 of FIG. 12B. In this block, the microcontroller checks to determine whether the current EGT is greater than the peak temperature already stored in block 248, and if so, the stored value is replaced with the current EGT in block 254. The microcontroller then returns to the main program routine of FIG. 11. If the current EGT does not exceed the previously stored peak value, the microcontroller proceeds to decision block 256 and determines whether the elapsed time of the overtemperature event exceeds 300 seconds. If so, the microcontroller proceeds to decision block 258 and determines whether the current EGT remains above 875° C. If this inquiry also produces an affirmative result, the overtemperature event is still in progress and the microcontroller returns to the main program routine of FIG. 11.

If the microcontroller determines from decision block 256 that the elapsed time of the overtemperature event is not in excess of 300 seconds, the overtemperature event currently in progress is not a zone E event and hence the microcontroller proceeds to decision block 260 and determines whether the current EGT is less than or equal to 915° C. If it is, the overtemperature event has ended and the microcontroller proceeds to block 262, where the EVENT IN PROGRESS flag is set to false. This action is also taken in response to a negative finding in decision block 258, indicating that a zone E overtemperature event has ended. In either case, the microcontroller then proceeds to block 264, where the peak temperature and duration of the overtemperature event are stored in the EEPROM 143 of FIGS. 3B and 5. The event number (E01, E02 and so on) and temperature zone (A, B, C, D, or E) are inferred by the microcontroller 90 during the retrieval operation based on the stored duration and peak temperature data. This is possible since the overtemperature events are stored in the order of their occurrence, and the microcontroller is programmed with a software version of the temperature zone graph of FIG. 8. Thus, the event number and temperature zone data need not be stored in the EEPROM 143 and the available storage space in the EEPROM 143 can be used more efficiently.

FIG. 13 is a flow chart illustrating a program routine which is carried out by the microcontroller 90 in order to update the maximum EGT value for an entire aircraft flight. In decision block 266, the microcontroller checks to determine whether the maximum EGT indication reset switch 85 of FIG. 3A has been activated. If it has, the microcontroller proceeds to block 268 and resets the maximum EGT indication stored in the RAM 97 of microcontroller 90 (which was read from the EEPROM 143 during power-up) to 0° C. At that point, or in the event that the maximum EGT indication reset switch is found not to have been activated in decision block 266, the microcontroller proceeds to decision block 270 and determines whether the measured EGT value was less than or equal to 400° C. during the last pass through the program routine of FIG. 13. If so, it is likely that the aircraft has begun a new flight and that the turbine engine has not yet reached normal operating temperature. Under these circumstances, the microcontroller 90 proceeds to decision block 272 and checks to determine whether the current EGT value exceeds 400° C. If not, no action is taken and the microcontroller returns to the main program routine of FIG. 1. Thus, if the maximum EGT value stored in the microcontroller RAM 97 is recalled by the flight crew at this point, the displayed reading will still be 0° C. (if the reset switch 85 has been operated) or the maximum EGT value from the previous flight (if the reset switch 85 has not been operated). Once the current EGT value is in excess of 400° C., however, the microcontroller proceeds to block 274 and replaces the previously stored maximum EGT value in the microcontroller RAM 97 (i.e., the 0° value from block 268 or the stored value from the previous flight) with the current EGT value. The microcontroller then returns to the main program routine of FIG. 11. On subsequent passes through the program routine of FIG. 13, the EGT will be found to exceed 400° C. in decision block 270, and the microcontroller will then proceed to decision block 275 and determine whether the current EGT is greater than the maximum value previously stored in the microcontroller RAM 97. If not, the microcontroller returns to the main program routine of FIG. 11. If the current EGT exceeds the stored maximum value, however, the microcontroller proceeds to block 274 and replaces the maximum EGT value stored in the microcontroller RAM with the current EGT. The microcontroller will then return to the main program routine of FIG. 11, as before. Thus, it will be seen that updating of the maximum EGT value takes place automatically after the turbine engine has reached a minimum operating temperature of 400° C., regardless of whether the reset switch 85 has been operated. This prevents the flight crew from being misled by a maximum EGT value from an earlier flight in the event that operation of the reset switch 85 has been overlooked at the beginning of a flight. During the course of a given flight, the maximum EGT value is stored in the microcontroller RAM 97 for the duration of the flight, so that it is available for retrieval and display by the flight crew in the manner described below. The maximum EGT value is transferred to the EEPROM 143 only when the exhaust gas temperature indicator 20 is powered down, thereby reducing the number of write operations that must be performed by the EEPROM 143.

Figure 14A:
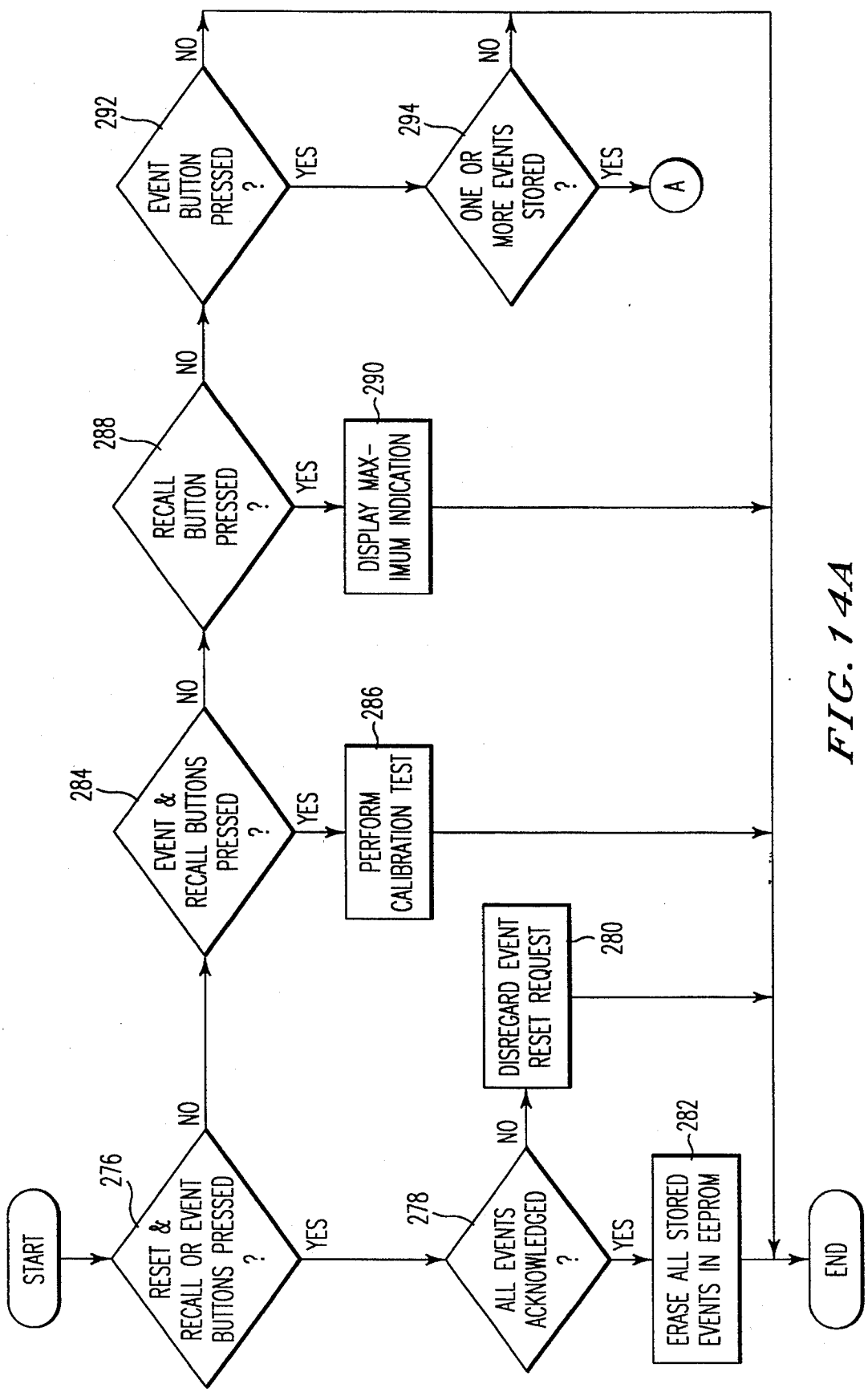
FIGS. 14A and 14B comprise a flow chart of a program routine which is carried out by the microcontroller in order to retrieve and display stored overtemperature event data.
Figure 14B:
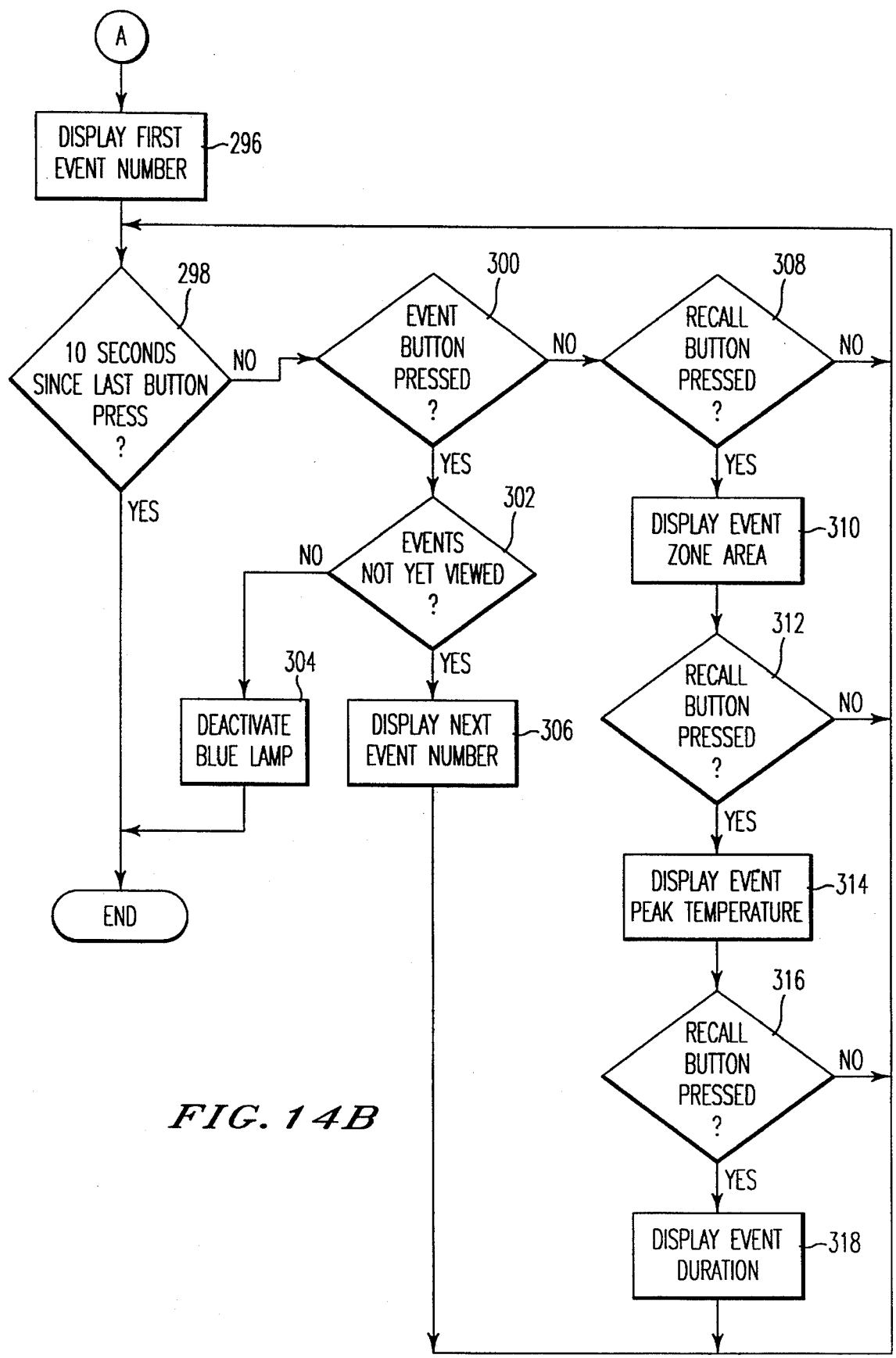

FIGS. 14A and 14B comprise a flow chart of a program routine which controls the response of the microcontroller 90 to actuation of the EVENT, RECALL and RESET pushbuttons 32, 34 and 50, respectively. In decision block 276, the microcontroller checks to determine whether the RESET pushbutton 50 and either of the EVENT or RECALL pushbuttons 32 or 34 are depressed at the same time. If so, this is taken as an indication that the flight crew wishes to erase all of the stored overtemperature event data from the EEPROM 143 of FIGS. 3B and 5. Before this can be done, however, the microcontroller proceeds to decision block 278 and checks to determine whether all of the discrete overtemperature events recorded in the EEPROM 143 have been acknowledged. This is accomplished by checking the state of the software flag associated with the blue overtemperature event lamp 36, which is not extinguished by the microcontroller 90 until all stored overtemperature events have been reviewed. If the flag is found to be set, indicating that one or more overtemperature events have not been acknowledged, the microcontroller proceeds to block 280 and disregards the reset request. Control then returns to the main program routine of FIG. 11. However, if the flag is found not to be set in decision block 278, indicating that all overtemperature events have been acknowledged, the microcontroller proceeds to block 282 and erases (i.e., zeroes out) all of the stored overtemperature event data from the EEPROM 143. Control then returns to the main program routine of FIG. 11 as before.

If the microcontroller determines in decision block 276 that a reset request has not been made, it proceeds to decision block 284 and checks to determine whether the EVENT and RECALL pushbuttons 32 and 34 are being depressed at the same time. Simultaneous depression of these pushbuttons by the flight crew is taken as an indication that a calibration test is to be performed, typically at the beginning of a flight. Under these circumstances, the microcontroller proceeds to block 286 and performs the calibration test by causing the driver circuit 148 of FIG. 3B to produce a signal on line 108 of FIG. 3A. This causes the contacts of the relay 110 of FIG. 3A to move to the position shown. In this position, a signal is produced by the simulated signal circuit 112 of FIG. 3A and applied to the microcontroller 90 through the signal amplifier 102 and A/D converter 104. The flight crew should then observe a 916° reading on the digital display 24 and analog pointer 22, and the red overtemperature warning lamp 28 should also illuminate. If the calibration test is not passed, the microcontroller 90 causes the digital display 24 to read "bAd" and the analog pointer 22 to move to a position below 0° C. This indicates to the flight crew that maintenance or replacement of the exhaust gas temperature indicator 20 is required. The microcontroller 90 is programmed to allow the calibration test to be performed only when the actual EGT reading is below 400° C.

If the microcontroller determines in decision block 284 that the EVENT and RECALL pushbuttons 32 and 34 are not being depressed simultaneously, the microcontroller proceeds to decision block 288 and checks to determine whether the RECALL pushbutton 34 alone is being depressed. Normally, the RECALL pushbutton is depressed only after the EVENT pushbutton (to retrieve stored overtemperature data) or simultaneously with the EVENT pushbutton (to perform the calibration test just described). If only the RECALL pushbutton 34 is depressed, this is taken as an indication that the flight crew wishes to retrieve the maximum flight EGT value from the microcontroller RAM 97. The microcontroller 90 performs this operation in block 290, with the maximum EGT value being displayed by the digital display 24. This value will correspond to the maximum EGT from the previous flight if the current EGT has not yet reached 400° C. following power-up, or to the maximum EGT from the current flight if the EGT has exceeded 400° C. following power-up. As is the case during retrieval of stored overtemperature event data, the analog pointer 22 continues to indicate the current EGT when the digital display is being used to indicate the stored maximum EGT value. After a predetermined period of time (preferably about 2 seconds), the digital display 24 reverts to normal operation and displays the current EGT value along with the analog pointer 22.

If the microcontroller determines in decision block 288 that the RECALL pushbutton 34 is not being depressed, it proceeds to decision block 292 and checks to determine whether the EVENT pushbutton 32 is being depressed. If not, no action is being requested by the flight crew and the microcontroller returns to the main program routine of FIG. 11. If the EVENT pushbutton is being depressed, the microcontroller proceeds to decision block 294 and determines whether any overtemperature event data (i.e., data relating to one or more discrete overtemperature events) is currently stored in the EEPROM 143 of FIGS. 3B and 5. If not, no data retrieval is possible and the microcontroller returns to the main program routine of FIG. 11. If stored overtemperature data is found to exist, however, the microcontroller proceeds to block 296 of FIG. 14B and displays the number of the first overtemperature event. This will be E01 during the first pass through the program routine, E02 during the second pass, and so on. The microcontroller then proceeds to decision block 298 and checks to determine whether a period of 10 seconds has elapsed since either of the pushbuttons 32 or 34 has been actuated. If so, this is taken as an indication that no further information is being requested and the microcontroller returns to the main program routine of FIG. 11. If fewer than 10 seconds have elapsed, however, the microcontroller proceeds to decision block 300 and again checks to determine whether the EVENT pushbutton 32 is being depressed. If so, the microcontroller then proceeds to decision block 302 and determines whether the EEPROM 143 contains any discrete overtemperature event data which has not yet been acknowledged. This is done by comparing the number of EEPROM buffer locations which contain non-zero data with a running count of the number of events which have already been reviewed. If no unacknowledged data is found to exist, the microcontroller proceeds to block 304 and extinguishes the blue overtemperature event lamp 36. The software flag is also reset by the microcontroller at this point. The microcontroller then returns to the main program routine of FIG. 11. Thus, it will be seen that the blue overtemperature event lamp 36 will remain illuminated (and the software flag will remain set) whenever any of the stored overtemperature events have not been acknowledged, even if other stored overtemperature events have been acknowledged. In other words, the microcontroller 90 does not recognize a partial acknowledgement of the stored events, and will not extinguish the lamp 36 or permit erasure of any of the stored data until all of the events have been acknowledged by depressing the EVENT pushbutton 32 the required number of times. Each time that the stored events are presented for review, all of the stored events will be displayed (i.e., beginning with event E01), not merely the events that were not displayed previously. This insures, for example, that maintenance personnel reviewing the stored overtemperature event data will not be misled by the absence of overtemperature events that may have been reviewed previously by the flight crew.

If the microcontroller determines in decision block 302 that unacknowledged overtemperature event data remains in the EEPROM 143, the microcontroller proceeds to block 306 and displays the next event number (i.e., E02, E03 and so on). The microcontroller then returns to decision block 298 and re-executes the program loop containing blocks 298-306 for as long as the EVENT pushbutton 32 remains depressed, causing the next event number to be continuously displayed. When the EVENT pushbutton 32 is released, causing a negative determination to be made in decision block 300, the microcontroller proceeds to decision block 308 and checks to determine whether the RECALL pushbutton 34 is being depressed. If not, the microcontroller returns to decision block 298 and then to the main program routine of FIG. 11 if no further pushbuttons are actuated within the 10-second interval. However, if the RECALL pushbutton 34 is found to be depressed in decision block 308 after release of the EVENT pushbutton 32 in decision block 300, this is taken as an indication that the flight crew wishes to retrieve stored overtemperature event data. Under these circumstances, the microcontroller proceeds to block 310 and displays the temperature zone (A, B, C, D or E) which characterizes the discrete overtemperature event whose number was displayed in block 296 or 306. The temperature zone is computed by the microcontroller 90 based on the stored duration and peak temperature data, using a program routine which is essentially a software version of the graph of FIG. 8. The microcontroller then proceeds to decision block 312 and checks to determine whether the RECALL pushbutton 34 has been depressed again. If not, the microcontroller returns to decision block 298. If the RECALL pushbutton has been depressed again, however, the microcontroller proceeds to block 314 and displays the peak temperature value of the stored overtemperature event on the digital display 24. The microcontroller then proceeds to decision block 316 and checks to determine whether the RECALL pushbutton 34 has been depressed a third time. If not, the microcontroller returns to decision block 298. If the RECALL pushbutton has been depressed, the microcontroller proceeds instead to block 318 and displays the duration (in seconds) of the stored overtemperature event on the digital display 24. At this point, the display of stored data corresponding to a discrete overtemperature event has been completed, and the microcontroller returns to decision block 298. The microcontroller can then be caused to display the zone, peak temperature and duration data for the same overtemperature event once again (by repeated depressing the RECALL pushbutton without depressing the EVENT pushbutton), or to display the next event number followed by the zone, peak temperature and duration data for the next overtemperature event (by depressing the EVENT pushbutton before the RECALL pushbutton). If no pushbuttons are operated within the 10-second interval, the microcontroller exits the program routine of FIG. 14B and returns to the main program routine of FIG. 11.

The overtemperature event data is not erased from the EEPROM 143 even after it has been acknowledged by operating the EVENT and RECALL pushbuttons 32 and 34 in the manner described above. Thus, the data can be reviewed again if desired, although the blue overtemperature event indicator 36 is no longer illuminated to remind the flight crew that this data is still present. The data will remain in the memory until the RESET pushbutton 50 is depressed simultaneously with either of the pushbuttons 32 or 34, and will then be erased if previously acknowledged. If the EEPROM 143 reaches its capacity of 20 events and is not erased, new events will replace previously stored events on an event-by-event basis (i.e., event 21 replaces event 1, event 22 replaces event 2, and so on).

When power is removed from the exhaust gas temperature indicator 20, a power-down program routine is carried out by the microcontroller 90. This routine includes the steps of writing the maximum EGT value from the RAM of the microcontroller 90 to the EEPROM 143, bringing the analog pointer 22 to the zero position, and turning off all segments of the digital display 24. The removal of power will, of course, cause the digital display to turn off in any event, but by causing this to occur at the start of the power-down routine, the microcontroller conserves power for other power-down functions such as writing data to the EEPROM 143. The power-down routine is triggered by a microcontroller interrupt when a drop in power supply voltage is detected. If an overtemperature event is in progress when the power-down routine begins, the event is considered to be complete and the accrued duration and peak temperature data are transferred from the microcontroller RAM 97 to the EEPROM 143.

Although the present invention has been described with reference to a preferred embodiment, it should be understood that the invention is not limited to the details thereof. Various substitutions and modifications will occur to those of ordinary skill in the art, and all such substitutions and modifications are intended to be embraced within the scope of the invention as defined in the appended claims.

What is claimed is:

1. An exhaust gas temperature indicator for detecting, storing and displaying overtemperature events occurring during operation of a gas turbine engine, comprising:

a temperature input for receiving a temperature signal from a sensor associated with the gas turbine engine;

a control device coupled to said temperature input for comparing a sensed exhaust gas temperature represented by said temperature signal with a predetermined temperature limit, and for generating data representing a discrete overtemperature event for each instance in which said sensed temperature exceeds said predetermined temperature limit;

a storage device coupled to said control device for storing overtemperature event data relating to a plurality of discrete overtemperature events occurring at different times; and a character display coupled to said control device and controlled by said control device in accordance with said overtemperature data stored by said storage device for displaying character information corresponding to each of said discrete overtemperature events;

wherein said control device is effective to compare said sensed temperature with a plurality of predetermined temperature limits corresponding to different temperature zones, and wherein the displayed character information relating to each of said discrete overtemperature events includes the temperature zone of said overtemperature event.

2. An exhaust gas temperature indicator as claimed in claim 1, wherein the displayed character information relating to each of said discrete overtemperature events further includes a numerical display of the peak temperature attained during said overtemperature event.

3. An exhaust gas temperature indicator as claimed in claim 1, wherein the displayed character information relating to each of said discrete overtemperature events further includes a numerical display of the duration of said overtemperature event.

4. An exhaust gas temperature indicator as claimed in claim 1, wherein the displayed character information relating to each of said discrete overtemperature events further includes the order of occurrence of said overtemperature event relative to at least one other overtemperature event.

5. An exhaust gas temperature indicator as claimed in claim 1, wherein said storage device comprises a nonvolatile memory.

6. An exhaust gas temperature indicator as claimed in claim 1, further comprising an event switch coupled to said control device, said event switch when actuated causing said character display to display character information corresponding to at least one discrete overtemperature event for which overtemperature event data is stored in said storage device, and causing said control device to record an acknowledgment of the overtemperature event information for which the corresponding character information has been displayed by said charcter display.

7. An exhaust gas temperature indicator as claimed in claim 6, wherein said event switch comprises a momentary switch, and wherein said control device is responsive to repeated actuation of said event switch to cause said character display to successively display character information relating to other discrete overtemperature events for which overtemperature event data is stored in said storage device.

8. An exhaust gas temperature indicator as claimed in claim 6, further comprising an overtemperature event indicator coupled to said control device for indicating the presence of unacknowledged overtemperature event data in said storage device, said control device being operative to disable said overtemperature event indicator when no unacknowledged overtemperature event data remains in said storage device.

9. An exhaust gas temperature indicator as claimed in claim 6, further comprising a reset switch coupled to said control device, said control device being responsive to the actuation of said reset switch and the absence of unacknowledged overtemperature event data in said storage device to erase said overtemperature event data from said storage device.

10. An exhaust gas temperature indicator as claimed in claim 6, wherein said character display in the absence of event switch actuation displays a numerical indication of the current exhaust gas temperature represented by said temperature signal.

11. An exhaust gas temperature indicator as claimed in claim 10, further comprising an analog display coupled to said control device for providing a continuous analog display of the current exhaust gas temperature represented by said temperature signal.

12. An exhaust gas temperature indicator as claimed in claim 1, wherein the displayed character information corresponding to each of said discrete overtemperature events includes at least one overtemperature parameter in addition to said temperature zone, only one of said parameters being displayed at any given time by said character display, and further comprising a recall switch coupled to said control device, said control device being responsive to actuation of said recall switch to cause said character display to display a different one of said overtemperature parameters relating to the same discrete overtemperature event.

13. An exhaust gas temperature indicator as claimed in claim 12, wherein said additional overtemperature parameter is selected from the group consisting of:

a numerical display of the peak temperature attained during said overtemperature event;

a numerical display of the duration of said overtemperature event; and the order of occurrence of said overtemperature event relative to at least one other overtemperature event.

14. An exhaust gas temperature indicator as claimed in claim 12, wherein said recall switch comprises a momentary switch, and wherein said control device is responsive to repeated actuation of said recall switch to cause said character display to successively display each of said overtemperature parameters.

15. An exhaust gas temperature indicator for detecting, storing and displaying an overtemperature event occurring during operation of a gas turbine engine, comprising:

a temperature input for receiving a temperature signal from a sensor associated with the gas turbine engine;

a control device coupled to said temperature input for comparing a sensed exhaust gas temperature represented by said temperature signal with a predetermined temperature limit, and for generating overtemperature data when said sensed temperature exceeds said predetermined temperature limit;

a storage device coupled to said control device for storing said overtemperature data;

a display device coupled to said control device and controlled by said control device in accordance with said overtemperature data stored by said storage device to display said stored overtemperature data;

a first switch coupled to said control device, said first switch when actuated causing said display device to display said stored overtemperature data, and causing said control device to record an acknowledgement that the data has been displayed; and an indicator coupled to said control device for indicating a presence of unacknowledged overtemperature data in said storage device, said control device being operative to disable said indicator when no unacknowledged overtemperature event data remains in said storage device.

16. An exhaust gas temperature indicator as claimed in claim 15, wherein:

said storage device is operative to store and recall overtemperature data relating to a plurality of discrete overtemperature events occurring at different times;

said first switch comprises a momentary switch; and said control device is responsive to repeated actuation of said first switch to cause said display device to successively display overtemperature data relating to different ones of said discrete overtemperature events.

17. An exhaust gas temperature indicator as claimed in claim 15, further comprising a second switch coupled to said control device, said control device between responsive to the actuation of said second switch and the absence of unacknowledged overtemperature data in said storage device to erase said overtemperature data from said storage device.

18. An exhaust gas temperature indicator for monitoring the peak temperature value occurring during operation of a gas turbine engine, comprising:

a temperature input for receiving a temperature signal from a sensor associated with the gas turbine engine;

a control device coupled to said temperature input; and a storage device coupled to said control device for storing a peak temperature value under the control of said control device;

said control device being operative to compare a sensed exhaust gas temperature represented by said temperature signal with a predetermined minimum operating temperature, to monitor the peak temperature value represented by said temperature signal after said sensed exhaust gas temperature exceeds said predetermined minimum operating temperature, and to cause said storage device to store said peak temperature value.

19. An exhaust gas temperature monitor as claimed in claim 18, wherein said control device is operative to erase a previously stored peak temperature value after said sensed exhaust gas temperature exceeds said predetermined minimum operating temperature.

20. An exhaust gas temperature monitor as claimed in claim 18, further comprising:
   a display device coupled to said control device; and
   a switch coupled to said control device;
   wherein said control device is responsive to actuation of said switch to cause said display device to display said peak temperature value.

21. An exhaust gas temperature indicator for displaying exhaust gas temperatures occurring during operation of a gas turbine engine, comprising:
   a temperature input for receiving a temperature signal from a sensor associated with the gas turbine engine;
   a control device coupled to said temperature input for monitoring a sensed exhaust gas temperature represented by said temperature signal, and for generating data to be stored when said sensed temperature meets a predetermined condition;
   a storage device coupled to said control device for storing said data;
   a switch coupled to said control device;
   a character display coupled to and controlled by said control device for displaying character information, said control device being operative to cause said character display to normally display a numerical indication of the current exhaust gas temperature represented by said temperature signal, and said control device being operative in response to actuation of said switch and to said data stored in said storage device to cause said character display to display character information derived from the data stored in said storage device; and
   an analog display coupled to said control device for providing a continuous analog display of the current exhaust gas temperature represented by said temperature signal.

22. An exhaust gas temperature indicator as claimed in claim 21, wherein said predetermined condition is selected from the group consisting of an overtemperature condition and a peak temperature condition.

23. An exhaust gas temperature indicator as claimed in claim 21, wherein said character display comprises a digital display device, and wherein said analog display comprises a pointer display.

24. An exhaust gas temperature indicator for providing indications of overtemperature conditions occurring during operation of a gas turbine engine, comprising:
   a temperature input for receiving a temperature signal from a sensor associated with the gas turbine engine;
   a control device coupled to said temperature input for monitoring a sensed exhaust gas temperature represented by said temperature signal, and for comparing said sensed temperature with a predetermined caution level temperature and a predetermined warning level temperature, respectively, said warning level temperature being higher than said caution level temperature;
   a display device coupled to and controlled by said control device for providing a quantitative indication of the current exhaust gas temperature represented by said temperature signal;
   an overtemperature caution indicator coupled to and controlled by said control device for indicating a current exhaust gas temperature in excess of said predetermined caution level temperature; and
   an overtemperature warning indicator coupled to and controlled by said control device for indicating a current exhaust gas temperature in excess of said predetermined warning level temperature.

25. An exhaust gas temperature indicator as claimed in claim 24, wherein said display device comprises an analog pointer display.

26. An exhaust gas temperature indicator as claimed in claim 24, wherein said display device comprises a digital display device.

27. An exhaust gas temperature indicator as claimed in claim 24, wherein said overtemperature caution indicator and said overtemperature warning indicator comprise lighted indicators having different colors.

28. A method for detecting, storing and displaying exhaust gas overtemperature events occurring during operation of a gas turbine engine, comprising the steps of:
   receiving a temperature signal from a sensor associated with the gas turbine engine;
   comparing a sensed exhaust gas temperature represented by said temperature signal with a predetermined temperature limit;
   generating data representing a discrete overtemperature event for each instance in which said sensed temperature exceeds said predetermined temperature limit;
   storing overtemperature event data relating to a plurality of discrete overtemperature events occurring at different times;
   recalling said overtemperature event data; and
   utilizing said recalled overtemperature event data to control a display of character information corresponding to each of said discrete overtemperature events;
   wherein the displayed character information relating to each of said discrete overtemperature events includes a numerical display of the peak temperature attained during said overtemperature event.

29. A method for detecting, storing and displaying exhaust gas overtemperature events occurring during operation of a gas turbine engine, comprising the steps of:
   receiving a temperature signal from a sensor associated with the gas turbine engine;
   comparing a sensed exhaust gas temperature represented by said temperature signal with a predetermined temperature limit;
   generating data representing a discrete overtemperature event for each instance in which said sensed temperature exceeds said predetermined temperature limit;
   storing overtemperature event data relating to a plurality of discrete overtemperature events occurring at different times;
   recalling said overtemperature event data; and
   utilizing said recalled overtemperature event data to control a display of character information corresponding to each of said discrete overtemperature events;
   wherein the displayed character information relating to each of said discrete overtemperature events includes a numerical display of the duration of said overtemperature event.

30. A method for detecting, storing and displaying exhaust gas overtemperature events occurring during the operation of a gas turbine engine, comprising the steps of:

receiving a temperature signal from a sensor associated with a gas turbine engine;

comparing a sensed exhaust gas temperature represented by said temperature signal with a predetermined temperature limit;

generating data representing a discrete overtemperature event for each instance in which said sensed temperature exceeds said predetermined temperature limit;

storing overtemperature event data relating to a plurality of discrete overtemperature events occurring at different times;

recalling said overtemperature event data; and utilizing said recalled overtemperature event data to control a display of character information corresponding to each of said discrete overtemperature events;

wherein the step of comparing said sensed temperature with a predetermined temperature limit comprises comparing said sensed temperature with a plurality of predetermined temperature limits corresponding to different temperature zones, and wherein the displayed character information relating to each of said discrete overtemperature events includes the temperature zone of said overtemperature event.

31. A method for detecting, storing and displaying exhaust gas overtemperature events occurring during operation of a gas turbine engine, comprising the steps of:

receiving a temperature signal from a sensor associated with the gas turbine engine;

comparing a sensed exhaust gas temperature represented by said temperature signal with a predetermined temperature limit;

generating data representing a discrete overtemperature event for each instance in which said sensed temperature exceeds said predetermined temperature limit;

storing overtemperature event data relating to a plurality of discrete overtemperature events occurring at different times;

recalling said overtemperature event data;

utilizing said recalled overtemperature event data to control a display of character information corresponding to each of said discrete overtemperature events; and recording an acknowledgement of the overtemperature event information for which the corresponding character information has been displayed by said character display.

32. A method as claimed in claim 31, further comprising the steps of:

producing an overtemperature event indication when overtemperature event data has been stored;

disabling said overtemperature event indicator when all stored overtemperature event data has been acknowledged.

33. A method as claimed in claim 31, further comprising the steps of;

receiving a reset signal;

erasing said stored overtemperature event data in response to said reset signal if said overtemperature event data has been acknowledged;

retaining said stored overtemperature event data following said reset signal if said overtemperature event data has not been acknowledged.

34. A method for detecting, storing and displaying exhaust gas overtemperature events occurring during operation of a gas turbine engine, comprising the steps of:

receiving a temperature signal from a sensor associated with the gas turbine engine;

comparing a sensed exhaust gas temperature represented by said temperature signal with a predetermined temperature limit;

generating data representing a discrete overtemperature event for each instance in which said sensed temperature exceeds said predetermined temperature limit;

storing overtemperature event data relating to a plurality of discrete overtemperature events occurring at different times;

recalling said overtemperature event data; and utilizing said recalled overtemperature event data to control a display of character information corresponding to each of said discrete overtemperature events;

wherein the step of displaying said character information comprises the steps of:

during a first time interval, displaying a first overtemperature parameter relating to a discrete overtemperature event; and during a second time interval, displaying a second overtemperature parameter relating to the same discrete overtemperature event.

35. A method as claimed in claim 34, wherein said overtemperature parameters are selected from the group consisting of:

a numerical display of the peak temperature attained during said overtemperature event;

a numerical display of the duration of said overtemperature event; and the order of occurrence of said overtemperature event relative to at least one other overtemperature event.

36. A method as claimed in claim 34, wherein the step of comparing said sensed temperature with a predetermined temperature limit comprises comparing said sensed temperature with a plurality of predetermined temperature limits corresponding to different temperature zones, and wherein said overtemperature parameters are selected from the group consisting of:

a numerical display of the peak temperature attained during said overtemperature event;

a numerical display of the duration of said overtemperature event;

the order of occurrence of said overtemperature event relative to at least one other overtemperature event; and the temperature zone of said overtemperature event.

37. A method for generating, storing and displaying exhaust gas temperature data during operation of a gas turbine engine, comprising the steps of:

receiving a temperature signal from a sensor associated with the gas turbine engine;

comparing a sensed exhaust gas temperature represented by said temperature signal with a predetermined temperature limit;

generating overtemperature data when said sensed temperature exceeds said predetermined temperature limit;

storing said overtemperature data;

producing an indication signifying that said overtemperature data has been stored;

receiving a display command;

in response to said display command, recalling said overtemperature data and utilizing said recalled overtemperature data to control a display of said data; and disabling said indication upon recall and display of said overtemperature data.

38. A method as claimed in claim 36, wherein only a portion of said overtemperature data is recalled and displayed in response to each occurrence of said display command, and wherein said indication is disabled only after all of said overtemperature data has been recalled and displayed.

39. A method as claimed in claim 38, further comprising the steps of:

recording an acknowledgement of overtemperature data which has been recalled and displayed;

disabling said indication only after all of said stored overtemperature data has been acknowledged.

40. A method as claimed in claim 38, wherein the portion of said overtemperature data which is recalled in response to each occurrence of said display command comprises data relating to a discrete overtemperature event.

41. A method as claimed in claim 38, further comprising the steps of:

receiving an erase command;

erasing said stored overtemperature data in response to said erase command only if all of said overtemperature data has been recalled and displayed.

42. A method for monitoring the peak exhaust gas temperature value occurring during operation of a gas turbine engine, comprising the steps of:

receiving a temperature signal from a sensor associated with the gas turbine engine;

comparing a sensed exhaust gas temperature represented by said temperature signal with a predetermined minimum operating temperature;

in response to said comparison step indicating that said sensed exhaust gas temperature exceeds said predetermined minimum operating temperature, monitoring the peak temperature value represented by said temperature signal; and storing said peak temperature value.

43. A method as claimed in claim 42, further comprising the step of erasing a previously stored peak temperature value in response to said comparison step indicating that said sensed exhaust gas temperature exceeds said predetermined minimum operating temperature.

44. A method as claimed in claim 42, further comprising the steps of:

receiving a display command; and displaying said peak temperature value in response to said display command.

45. A method for generating, storing and displaying exhaust gas temperature data during operation of a gas turbine engine, comprising the steps of:

receiving a temperature signal from a sensor associated with the gas turbine engine;

providing a first display of the current exhaust gas temperature represented by said temperature signal;

generating data to be stored when said sensed temperature meets a predetermined condition;

storing said data;

receiving a display command;

recalling said stored data in response to said display command;

utilizing said recalled data to provide a second display of said recalled data concurrently with said first display of the current exhaust gas temperature.

46. A method as claimed in claim 45, wherein one of said first and second displays comprises an analog display, and wherein the other of said first and second displays comprises a character display.

47. A method as claimed in claim 45, wherein said predetermined condition is selected from the group consisting of an overtemperature condition and a peak temperature condition.

48. A method for providing indications of exhaust gas overtemperature conditions occurring during operation of a gas turbine engine, comprising the steps of:

receiving a temperature signal from a sensor associated with the gas turbine engine;

comparing a sensed exhaust gas temperature represented by said temperature signal with a predetermined caution level temperature and a predetermined warning level temperature, respectively, said warning level temperature being higher than said caution level temperature;

providing a first indication in response to said comparison step indicating that the sensed exhaust gas temperature exceeds said predetermined caution level temperature; and providing a second indication in response to said comparison step indicating that the sensed exhaust gas temperature exceeds said predetermined warning level temperature.

49. A method as claimed in claim 48, further comprising the step of continuously providing a quantitative indication of the current exhaust gas temperature represented by said temperature signal.

50. A method as claimed in claim 48, wherein the steps of providing said first and second indications respectively comprise the steps of enabling first and second visual indicators having different colors.

* * * * *